United States Patent
Pan et al.

(10) Patent No.: US 12,443,648 B2
(45) Date of Patent: Oct. 14, 2025

(54) METHODS AND DEVICE FOR INFORMATION PRESENTING AND INFORMATION PROCESSING

(71) Applicant: NEC CORPORATION, Tokyo (JP)

(72) Inventors: Zheng Pan, Beijing (CN); Lu Feng, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/600,008

(22) Filed: Mar. 8, 2024

(65) Prior Publication Data

US 2024/0320259 A1   Sep. 26, 2024

(30) Foreign Application Priority Data

Mar. 21, 2023 (CN) .......................... 202310281107.7
Mar. 21, 2023 (CN) .......................... 202310283208.8

(51) Int. Cl.
*G06F 16/00* (2019.01)
*G06F 16/28* (2019.01)
(Continued)

(52) U.S. Cl.
CPC ............ *G06F 16/44* (2019.01); *G06F 16/288* (2019.01); *G06F 16/438* (2019.01); *G06F 16/9024* (2019.01)

(58) Field of Classification Search
CPC ...... G06F 16/44; G06F 16/438; G06F 16/288; G06F 16/9024
(Continued)

(56) References Cited

U.S. PATENT DOCUMENTS 9,881,077 B1    1/2018 Alfonseca et al.
10,978,184 B2 *  4/2021 Sorenson ............... G16H 10/20
                                                  707/707
(Continued)

FOREIGN PATENT DOCUMENTS

CN    111538872 A    8/2020
JP    2008203964 A   9/2008
(Continued)

OTHER PUBLICATIONS

United States Office Action dated Jan. 17, 2025 in U.S. Appl. No. 18/598,202.
(Continued)

*Primary Examiner* — Alexandria Y Bromell
(74) *Attorney, Agent, or Firm* — Sughrue Mion, PLLC

(57) ABSTRACT

According to embodiments of the present disclosure, a method and apparatus for information presenting are provided. The method includes presenting a first event evolutionary graph corresponding to a media content. The first event evolutionary graph includes at least a first node representing a first event, a second node representing a second event, and a first directed edge representing a first event relationship between the first event and the second event. The first event, the second event, and the first event relationship are determined from the media content. The method further includes presenting a second event evolutionary graph in association with the first event evolutionary graph. The second event evolutionary graph comprises at least a third node representing a third event. A first event factor of at least one event of the first event or the second event matches a second event factor of the third event.

18 Claims, 13 Drawing Sheets

(51) Int. Cl.
*G06F 16/438* (2019.01)
*G06F 16/44* (2019.01)
*G06F 16/901* (2019.01)

(58) Field of Classification Search
USPC .......................................................... 707/722
See application file for complete search history.

(56) References Cited

U.S. PATENT DOCUMENTS

| | | |
|---|---|---|
| 2011/0055426 A1 | 3/2011 | Lakshmanan et al. |
| 2018/0309637 A1 | 10/2018 | Gill et al. |
| 2021/0026888 A1 | 1/2021 | Pang |
| 2021/0191506 A1* | 6/2021 | Wang ...................... G06F 3/017 |
| | | 707/707 |
| 2022/0138587 A1* | 5/2022 | Chen ...................... G06N 3/082 |
| | | 706/45 |
| 2023/0052225 A1* | 2/2023 | Edington ........... G06Q 30/0201 |
| | | 707/707 |
| 2023/0073220 A1 | 3/2023 | Del Villar et al. |
| 2023/0186059 A1* | 6/2023 | Laszlo ................... G06N 3/061 |
| | | 706/15 |

FOREIGN PATENT DOCUMENTS

| | | |
|---|---|---|
| JP | 2013210868 A | 10/2013 |
| JP | 2018022248 A | 2/2018 |
| JP | 2018523862 A | 8/2018 |
| JP | 2019117442 A | 7/2019 |
| WO | 2020129905 A1 | 6/2020 |

OTHER PUBLICATIONS

Japanese Office Action corresponding to Japanese Patent Application No. 2024-043176, mailed Jul. 1, 2025.

* cited by examiner

METHODS AND DEVICE FOR INFORMATION PRESENTING AND INFORMATION PROCESSING

CROSS-REFERENCE

The present application claims priorities to Chinese Patent Application No. 202310281107.7, filed on Mar. 21, 2023, and entitled "METHOD AND DEVICE FOR INFORMATION PRESENTING" and Chinese Patent Application No. 202310283208.8, filed on Mar. 21, 2023, and entitled "METHOD AND DEVICE FOR INFORMATION PROCESSING", the entireties of which are incorporated herein by reference.

FIELD

Example embodiments of the present disclosure generally relate to the field of computers, and more particularly to methods and device for information presenting and information processing.

BACKGROUND

With the development of network technology and multimedia technology, the number of news increases exponentially every day, and there are a large number of duplicate news. The massive amount of news information occupies valuable reading time of users. On the other hand, news events do not occur in isolation. Users may want to understand the ins and outs of an event or may want to further understand the trend of the event through historical events, so as to predict the possible impact of the current event. Therefore, a solution is urgently needed to present news information to users in an intuitive and refined way. In addition, for users, the process of searching and filtering event-related information is very cumbersome. Therefore, a solution that can automatically sort, refine, and gain insights into various news is expected.

SUMMARY

In a first aspect of the present disclosure, a method of information presenting is provided. The method includes presenting a first event evolutionary graph corresponding to a media content. The first event evolutionary graph includes at least a first node representing a first event, a second node representing a second event, and a first directed edge representing a first event relationship between the first event and the second event. The first event, the second event, and the first event relationship are determined from the media content. The method further includes presenting a second event evolutionary graph in association with the first event evolutionary graph. The second event evolutionary graph comprises at least a third node representing a third event. A first event factor of at least one event of the first event or the second event matches a second event factor of the third event.

In a second aspect of the present disclosure, an electronic device is provided. The electronic device includes at least one processing circuit. The at least one processing circuit is configured to present a first event evolutionary graph corresponding to a media content. The first event evolutionary graph includes at least a first node representing a first event, a second node representing a second event, and a first directed edge representing a first event relationship between the first event and the second event. The first event, the second event, and the first event relationship are determined from the media content. The at least one processing circuit is further configured to present a second event evolutionary graph in association with the first event evolutionary graph. The second event evolutionary graph comprises at least a third node representing a third event. A first event factor of at least one event of the first event or the second event matches a second event factor of the third event.

In a third aspect of the present disclosure, an electronic device is provided. The device includes at least one processing unit; and at least one memory, at least one memory is coupled to at least one processing unit and stores instructions for execution by at least one processing unit. The instructions when executed by at least one processing unit cause the device to perform the method of the first aspect.

In a fourth aspect of the present disclosure, a computer-readable storage medium is provided. The computer-readable storage medium stores a computer program that can be executed by a processor to implement the method of the first aspect.

In a fifth aspect of the present disclosure, a method of information processing is provided. The method includes generating a first event evolutionary graph corresponding to a media content. The first event evolutionary graph comprises at least a first node representing a first event, a second node representing a second event, and a first directed edge representing a first event relationship between the first event and the second event. The first event, the second event, and the first event relationship are determined from the media content. The method further includes determining, based on a first event factor of at least one event of the first event or the second event, a third event having a second event factor matching the first event factor from a reference event evolutionary graph. The method further includes combining the first event evolutionary graph with a second event evolutionary graph comprising at least a third node representing the third event.

In a sixth aspect of the present disclosure, an electronic device is provided. The electronic device includes at least one processing circuit. The at least one processing circuit is configured to generate a first event evolutionary graph corresponding to a media content. The first event evolutionary graph comprises at least a first node representing a first event, a second node representing a second event, and a first directed edge representing a first event relationship between the first event and the second event. The first event, the second event, and the first event relationship are determined from the media content. The at least one processing circuit is further configured to determine, based on a first event factor of at least one event of the first event or the second event, a third event having a second event factor matching the first event factor from a reference event evolutionary graph. The at least one processing circuit is further configured to combine the first event evolutionary graph with a second event evolutionary graph comprising at least a third node representing the third event.

In a seventh aspect of the present disclosure, an electronic device is provided. The device includes at least one processing unit; and at least one memory, at least one memory is coupled to at least one processing unit and stores instructions for execution by at least one processing unit. The instructions when executed by at least one processing unit cause the device to perform the method of the fourth aspect.

In an eighth aspect of the present disclosure, a computer-readable storage medium is provided. The computer-readable storage medium stores a computer program that can be executed by a processor to implement the method of the fourth aspect.

It should be understood that the contents described in the content section of the present invention are not intended to limit the key features or important features of the embodiments of the present disclosure, nor are they intended to limit the scope of the present disclosure. Other features of the present disclosure will become readily understood from the following description.

BRIEF DESCRIPTION OF THE DRAWINGS

The above and other features, advantages and aspects of the various embodiments of the present disclosure will become more apparent in conjunction with the accompanying drawings and with reference to the following detailed description. In the drawings, like or similar reference numerals denote like or similar elements, wherein.

DETAILED DESCRIPTION

Figure 1A:
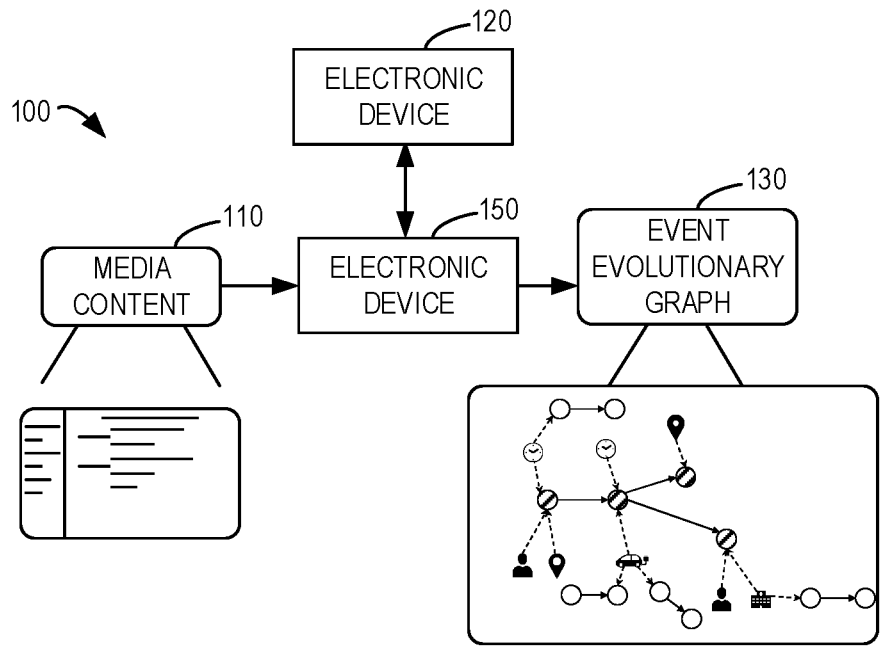
FIG. 1A illustrates a schematic diagram of an example environment in which embodiments of the present disclosure can be implemented.

The following will describe embodiments of the present disclosure in more detail with reference to the accompanying drawings. Although certain embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the accompanying drawings and embodiments of the present disclosure are only used for illustration, rather than limiting the protection scope of the present disclosure.

It should be noted that the titles of any section/sub-section provided herein are not restrictive. Various embodiments are described throughout herein, and any type of embodiment can be included under any section/sub-section. In addition, the embodiments described in any section/sub-section can be combined in any way with any other embodiments described in the same section/sub-section and/or different sections/sub-sections.

In the description of embodiments of the present disclosure, the term "comprise" and similar terms should be understood as open-ended inclusion, that is, "include, but not limited to". The term "based on" should be understood as "at least partially based on". The term "one embodiment" or "the embodiment" should be understood as "at least one embodiment". The term "some embodiments" should be understood as "at least some embodiments". The following may also include other explicit and implicit definitions.

The term "circuit" as used herein may refer to hardware circuitry and/or a combination of hardware circuitry and software. For example, a circuit may be a combination of analog and/or digital hardware circuitry with software/firmware. As another example, a circuit may be any part of a hardware processor with software, including (s) Digital Signal Processing, software, and memory(ies), which work together to enable the device to function to perform various functions. In yet another example, a circuit may be a hardware circuit and/or processor, such as part of a microprocessor or microprocessor, which requires software/firmware for operation, but the software may not exist when not required for operation. As used herein, the term "circuit" also encompasses only hardware circuitry or processors or a part of hardware circuitry or processors and its (or their) accompanying software and/or firmware implementations.

As used herein, the term "event" refers to a change in an event or state consisting of one or more actions in which one or more event subjects participate in a particular time and space.

As briefly mentioned above, users need to invest a lot of time in reading news and obtaining information, and the process of searching and filtering news is relatively cumbersome. On the other hand, with the development of network technology and multimedia technology, news can be presented in various types of media content, such as text, image, video, audio, or a combination thereof. This further increases the amount of news. In order to avoid massive news occupying users' reading time, it is expected to sort and refine the news and present it to users in a visual way.

One way is to show users the essential information of the news, but this way can only show the events and their progress in isolation in the current news but cannot show related events (such as the same event subject or the same industry, etc.). If users want to know about related events, further search is needed. This cannot allow users to efficiently understand the impact of events, etc.

To this end, some embodiments of the present disclosure propose a scheme for information presenting. The scheme includes presenting a first event evolutionary graph corresponding to a media content. The first event evolutionary graph includes at least a first node representing a first event, a second node representing a second event, and a first directed edge representing a first event relationship between the first event and the second event. The first event, the second event, and the first event relationship are determined from the media content. The scheme further includes presenting a second event evolutionary graph in association with the first event evolutionary graph. The second event evolutionary graph comprises at least a third node representing a third event. A first event factor of at least one event of the first event or the second event matches a second event factor of the third event.

Thus, users are shown the development and context of related events based on the current media content and extending outward. In this way, it can help users efficiently obtain intuitive and refined event information and its associated event information. It can also help users gain in-depth insight into media content, analyze the causes of events and/or predict the subsequent impact of events.

On the other hand, the traditional way is to manually search, classify, and organize particular news reports to provide users with related information. This method requires very high labor costs. Another way is to use information processing technologies such as search and clustering to collect, organize, and sort news according to release time. This method makes it difficult for users to understand the development process of events. This method can only display current events in isolation, cannot automatically associate matching events (such as the same event subject or the same industry), and is difficult to show the correlation and evolution process between events. In addition, this method cannot predict the possible impact of events, nor can it provide users with a reference through the development of similar historical events.

To this end, some embodiments of the present disclosure propose a scheme for information processing. The scheme includes generating a first event evolutionary graph corresponding to a media content. The first event evolutionary graph comprises at least a first node representing a first event, a second node representing a second event, and a first directed edge representing a first event relationship between the first event and the second event. The first event, the second event, and the first event relationship are determined from the media content. The scheme further includes determining, based on a first event factor of at least one event of the first event or the second event, a third event having a second event factor matching the first event factor from a reference event evolutionary graph. The scheme further includes combining the first event evolutionary graph with a second event evolutionary graph comprising at least a third node representing the third event.

In the embodiments of the present disclosure, the originally isolated individual event evolutionary graph of media content is extended. By using the extended event evolutionary graph, events with the same or similar elements can be linked together. Therefore, complex events can be organized through the evolutionary graph. In this way, the efficiency of processing media information can be improved, helping users efficiently obtain information of interest. By extending related events, it is also beneficial for users to gain in-depth insight into media content and understand the surrounding dynamics of the events described in the media content.

Example Environment

FIG. 1A illustrates a schematic diagram of an example environment 100 in which embodiments of the present disclosure can be implemented. In environment 100, a user (not shown) can browse a media content 110 through an electronic device 150. During user browsing or in response to user operations, the electronic device 150 may present an event evolutionary graph 130 associated with the media content 110. The electronic device 150 may communicate with an electronic device 120 to obtain the event evolutionary graph 130 built by the electronic device 120. In environment 100, the electronic device 120 may obtain the media content 110 and process it to generate the event evolutionary graph 130.

In the environment 100, the electronic device 120 and electronic device 150 may be any type of computing-capable device, including an terminal device. The terminal device may be any type of mobile terminal, fixed terminal, or portable terminal, including mobile phones, desktop computers, laptop computers, notebook computers, netbook computers, tablet computers, media computers, multimedia tablets, personal communication system (PCS) devices, personal navigation devices, personal digital assistants (PDAs), audio/video player, digital cameras/camcorders, positioning devices, television receivers, radio broadcast receivers, e-book devices, gaming devices, or any combination thereof, including accessories and peripherals of these devices or any combination thereof. The electronic device 120 may be any type of computing-capable device, including server devices. The server devices may include, for example, computing systems/servers, such as mainframes, Edge Computing nodes, computing devices in cloud environments, and so on.

The media content 110 may be any suitable form of content capable of providing information. For example, the media content 110 may be a news report in the form of text, image, audio, video, or a combination thereof. The media content 110 may be a media content obtained from various platforms (such as news platforms) or may be a stored media content. For the media content 110 in the form of text, the electronic device 120 may directly extract information for building the event evolutionary graph 130 from the text. For the media content 110 in the form of images, videos, audios, etc., the electronic device 120 may extract information for building the event evolutionary graph 130 from images, audios, or videos using any known or future developed technology. For example, electronic device 120 may directly extract related information from image, video, or audio formats based on image recognition or voice recognition technology.

An event evolutionary graph is used to represent events and the event relationships between different events. For example, the event evolutionary graph may be used to represent events and their event relationships with a logic directed graph. Such the logic directed graph has events as nodes and event relationships as directed edges.

Herein, event relationships are further referred to as association relationships or abbreviated as relationships. Such event relationships may include, but are not limited to, a causal relationship, a conditional relationship, a reversal relationship, a successive relationship, a superior and inferior relationship, a composition relationship, a concurrent relationship, a similarity relationship, and so on. As an example, the causal relationship refers to the occurrence of a previous event (cause) leading to the occurrence of a later event (result). The conditional relationship refers to a condition that a previous event is the occurrence of a later event. The reversal relationship refers to the formation of opposition between one event and another, for example, although one event occurs later, the other event develops rapidly. The successive relationship refers to the successive occurrence of a previous event and a subsequent event in time. The superior and inferior relationship refers to the fact that one event is a superior event or inferior event of another event, including both noun superior and inferior and verbal superior and inferior. For example, an event "food price increases" and an event "vegetable price increases" form a noun superior and inferior relationship; an event "kill" and an event "assassinate" are verbal superior and inferior relationship. The composition relationship refers to one event being a component of another event. The concurrent relationship refers to that one event occurs at the same time as another event. The similarity relationship refers to that one event is similar to another event to a certain extent. For example, the similarity relationship may be established through similarity calculation. The above event relationships are merely exemplary and are not intended to limit the scope of the present disclosure.

An event may have one or more event factors. Herein, the event factors are further referred to as factors. The factors of event may include, but are not limited to, event subject, event object, time, place, character, industry, company, product, and so on. In some embodiments, the event factors may be stored as attributes of the event associated with nodes representing the event.

It should be understood that the structure and function of the environment 100 are described for illustrative purposes only and are not intended to imply any limitation of the scope of the disclosure. In the description of FIG. 1A and subsequent descriptions, the event evolutionary graph 130 is built by the electronic device 120 and presented by the electronic device 150. However, this is only exemplary and is not intended to limit the scope of the disclosure. In some embodiments, the construction and presentation of the event evolutionary graph 130 may be implemented by the same device.

Figure 1B:
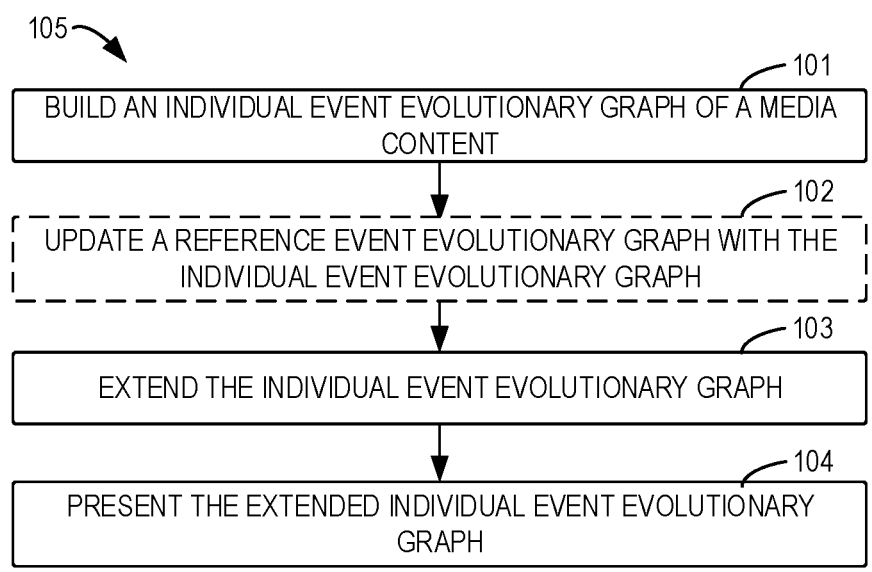
FIG. 1B illustrates a flowchart of a process of information processing according to some embodiments of the present disclosure.

In order to more clearly understand the scheme for information presenting according to the present disclosure, an overall process 105 implemented to generate the event evolutionary graph 130 is first described with reference to FIG. 1B. The process 105 may be implemented in the environment 100. Some blocks of the process 105 may be implemented by the electronic device 120, and other blocks may be implemented by the electronic device 150.

In order to present the event evolutionary graph 130, the electronic device 120 first generates an event evolutionary graph corresponding to the media content 110, which is further referred to as an individual event evolutionary graph. To this end, at block 101, the electronic device 120 builds an individual event evolutionary graph of a media content. The individual event evolutionary graph is used to represent events and relationships between events extracted from a single media content 110. To this end, the individual event evolutionary graph includes a plurality of nodes representing a plurality of events extracted from the media content 110. The individual event evolutionary graph further includes at least one directed edge representing event relationships between different events.

Furthermore, at block 103, the electronic device 120 extends the individual event evolutionary graph corresponding to the media content 110 to obtain the event evolutionary graph 130. Herein, extending the individual event evolutionary graph refers to combining one or more additional event evolutionary graphs (also referred to as additional event evolutionary graphs) with the individual event evolutionary graph. The additional event evolutionary graph may include one or more nodes, each node representing an event. Therefore, herein, the extended individual event evolutionary graph may also be referred to as a combined event evolutionary graph.

The event source used to extend the individual event evolutionary graph may be a reference event evolutionary graph. For example, the electronic device 120 may determine a subgraph that satisfies an extending condition from the reference event evolutionary graph and combine the subgraph with the individual event evolutionary graph. It should be understood that the individual event evolutionary graph may be an evolutionary graph for a specific number (e.g., one) of media content, while the reference event evolutionary graph is an evolutionary graph for a larger range of media content, which may be regarded as a global event evolutionary graph. In some embodiments, the reference event evolutionary graph may be built for specific fields, such as finance field and semiconductor field. Alternatively, the reference event evolutionary graph may be built across a plurality of fields or may be domain-free.

The electronic device 120 may extend the individual event evolutionary graph based on any suitable factor. In some embodiments, the electronic device 120 may extend the individual event evolutionary graph based on the event factors. Alternatively, in some embodiments, the electronic device 120 may extend the individual event evolutionary graph based on the event relationships. In some embodiments, the electronic device 120 may extend the individual event evolutionary graph based on the event factors and event relationships.

The process 105 is further used to present an event evolutionary graph. Specifically, at block 104, the electronic device 150 may present the extended individual event evolutionary graph, i.e., the event evolutionary graph 130.

Additionally, in some embodiments, the process 105 may further be used to update the reference event evolutionary graph. Specifically, at block 102, the electronic device 120 updates a reference event evolutionary graph using the individual event evolutionary graph. The electronic device 120 may further store and periodically update the reference event evolutionary graph to provide matching event sources when extending the individual event evolutionary graph.

The overall flow of the example process 105 that may be implemented in the environment 100 is described above with reference to FIG. 1B. It should be understood that the process 105 is only one example process for obtaining the event evolutionary graph to be presented, and the event evolutionary graph presented in the embodiments of the present disclosure may be generated in any suitable manner.

Example for Presenting an Event Evolutionary Graph

As briefly mentioned above, when a user browses the media content 110, an event evolutionary graph associated with the media content 110 may be presented. Some examples are described below with reference to FIGS. 2A to 2C.

Figure 2A:
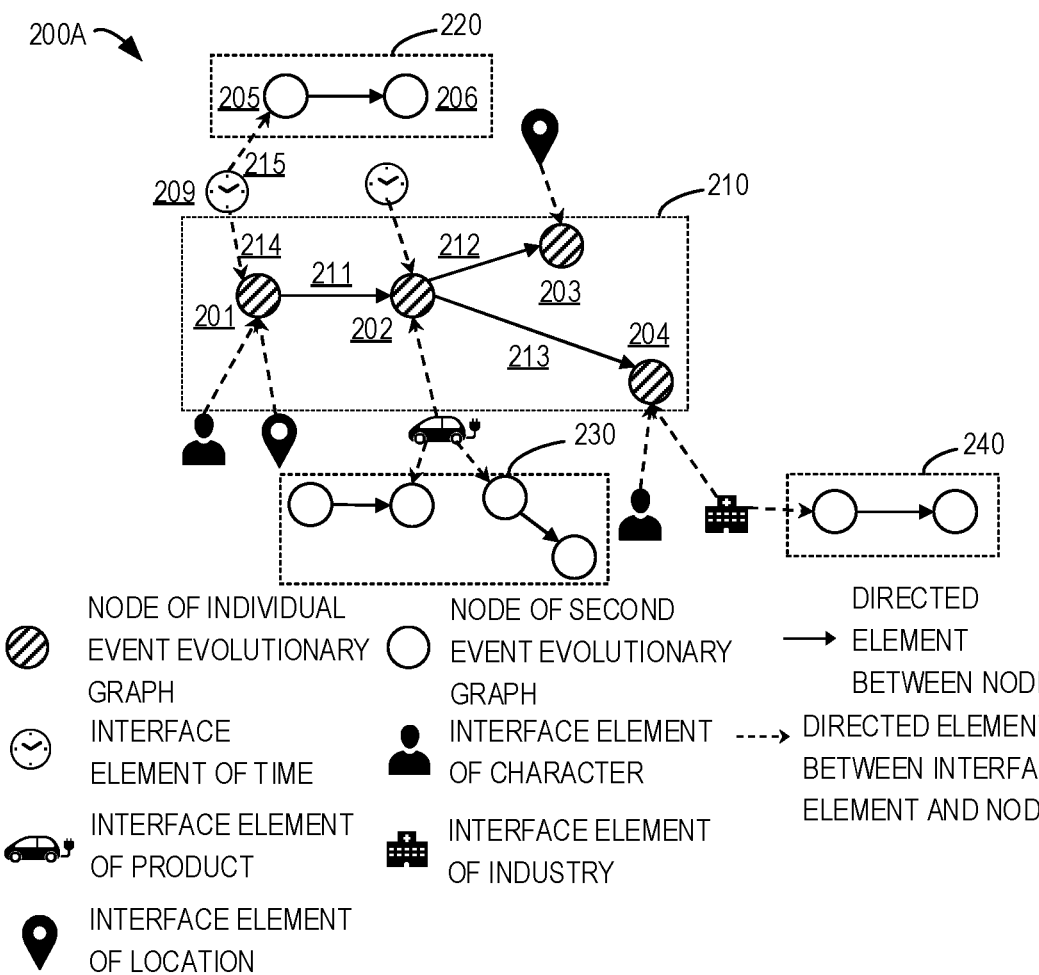
FIG. 2A to 2C illustrate examples of visual presentation of media content according to some embodiments of the present disclosure.

In the example of FIG. 2A, the electronic device 150 presents a visual presentation 200A as the user browses the media content 110. The visual presentation 200A includes an individual event evolutionary graph 210 corresponding to the media content 110. The individual event evolutionary graph 210 includes a plurality of nodes, in this example nodes 201, 202, 203, and 204. The visual pattern of these nodes is a circle filled with slashes. Each node represents an event extracted from the media content 110, e.g., the node 201 represents an event C, the node 202 represents an event D, the node 203 represents an event E, and the node 204 represents an event F.

The individual event evolutionary graph 210 further includes at least one directed edge, in this example a directed edge 211, a directed edge 212, and a directed edge 213. The visual pattern of these directed edges is a solid line with an arrow. Each directed edge represents an event relationship, for example, the directed edge 211 represents an event relationship between the events C and D, the directed edge 212 represents an event relationship between the events D and E, and the directed edge 213 represents an event relationship between the events D and F.

As described with reference to FIG. 1A, an event may have one or more event factors. In some embodiments, the electronic device 150 may further present a plurality of interface elements representing a plurality of event factors, respectively, each of which belongs to an event in the individual event evolutionary graph 210. For example, in the example of FIG. 2A, the event C has a time factor, a character factor, and a location factor. Correspondingly, an interface element of time representing the time factor, an interface element of character representing the character factor, and an interface element of location representing the location factor are presented in association with the node 201. As another example, the event D has a time factor and a product factor. Correspondingly, an interface element of time representing the time factor and an interface element of product representing the product factor are presented in association with the node 202.

In some embodiments of the present disclosure, the interface elements representing event factors may have any suitable form or effect. In FIG. 2A and other drawings, the interface elements representing event factors have visual effects corresponding to the event factors they represent. For example, the interface element of character is a character icon, the interface element of location is a location icon, and the interface element of product is an icon for a specific product. In this way, users may visually and intuitively understand how different events are related to each other through what types of element. However, it should be understood that this is only exemplary and interface elements may further be presented in other ways. In some embodiments, the interface elements may be presented as nodes (e.g., similar to nodes representing events, and may have the same or different shapes) and/or text. For example, the interface element representing the character factor may be presented as a node with a certain shape (such as a circle), and the node is identified with information such as the character's name.

The above describes example presenting of the individual event evolutionary graph 210 and corresponding event factors. The presented individual event evolutionary graph 210 and event factors may be obtained as described in the following with reference to FIG. 3.

In addition to the individual event evolutionary graph, the electronic device 150 further presents one or more additional event evolutionary graphs based on the event factors. Continuing with the example of FIG. 2A, the visual presentation 200A further includes additional event evolutionary graphs 220, 230, and 240. These additional event evolutionary graphs are equivalent to supplementing the information of the individual event evolutionary graph 210, which may help users clarify the ins and outs of events or understand related event information. As an example, the additional event diagram 220 includes a node 205, whose visual pattern is a hollow circle. The event represented by the node 205 has an event factor matching an event C represented by the node 201, which is a time factor in this example. The visual presentation 200A includes an interface element corresponding to the event factor, which is an interface element of time 209 in this example. The visual pattern of the interface element of time 209 is a clock icon. For details on matching event factors, see the description below.

In some embodiments, an additional event evolutionary graph based on event factors may have a plurality of hierarchies. That is, the additional event evolutionary graph may include a plurality of nodes. In the example of FIG. 2A, the additional event evolutionary graph 220 further includes a node 206, which represents an event that has an event relationship with the event represented by the node 205. The event relationship is represented by a directed edge, and its visual pattern is a solid line with an arrow. The additional event evolutionary graph 230 and the additional event evolutionary graph 240 are similar to the additional event evolutionary graph 220, so their descriptions are not repeated.

In some embodiments, the electronic device 150 may further present directed elements pointing from the interface element to the node to indicate that the event represented by the node has the event factors represented by the interface element. In particular, for two events having matching event factors, the nodes representing the two events may be visually associated through interface elements representing matching event factors. In the example of FIG. 2A, the visual presentation 200A further includes directed elements between the interface element and the node. For example, the events represented by the node 201 and node 205 have matching event factors. Correspondingly, a directed element 214 pointing from the interface element of time 209 to the node 201 is presented, and a directed element 215 pointing from the interface element of time 209 to the node 205 is presented. The visual pattern of these directed elements is a dashed line with an arrow.

It should be understood that the description of the visual pattern of each element in the visualization presentation 200A and the description of the visual correlation between the individual event evolutionary graph and the additional event evolutionary graph are only exemplary and are not intended to limit the scope of the present disclosure. The electronic device 150 may present the elements in these evolutionary graph s through various visual patterns, such as representing events in different evolutionary graphs with nodes of different patterns, representing the types of event relationships with the length, thickness, line type, or arrow direction of directed edges, and representing the types of event factors with interface elements of different icons. The electronic device 150 may present the visual correlation between the individual event evolutionary graph and the additional event evolutionary graph through different layouts. For example, the electronic device 150 may present the individual event evolutionary graph 210 and the additional event evolutionary graph 220 on both sides with the interface element of time 209 as the center. For another example, the electronic device 150 may present each element in the individual event evolutionary graph 210 and each element in the additional event evolutionary graph 220 around the interface element of time 209.

The additional event evolutionary graphs 220, 230, and 240 are extended based on event factors. See the description of FIGS. 7A to 7C below for how to extend the individual event evolutionary graph based on event factors. Continuing to describe some examples of the presented event evolutionary graph. In some embodiments, the electronic device 150 may further present one or more additional event evolutionary graphs based on event relationships. Referring to a visual presentation 200B shown in FIG. 2B. The difference between the visual presentation 200B and visual presentation 200A is that it further includes more additional event evolutionary graphs. Each of these additional event evolutionary graphs represents at least one event that has an event relationship with the event in the individual event evolutionary graph 210. For example, the visual presentation 200B includes an additional event evolutionary graph 250 extended from the node 201. The additional event evolutionary graph 250 includes a node 207. The events represented by the node 207 have an event relationship with the events represented by the node 201, such as those described above with reference to FIG. 1A. Additionally or alternatively, the visual presentation 200B may further include directed an edge 216 representing the event relationship.

In some embodiments, the additional event evolutionary graph that extends based on event relationships may have a plurality of hierarchies. That is, the additional event evolutionary graph may include a plurality of nodes. For example, the additional event evolutionary graph 250 further includes a node 208. The events represented by the node 208 have event relationships, such as causal relationships, with the events represented by the node 207.

In some embodiments, in addition to individual event evolutionary graphs and extended additional event evolutionary graphs, the electronic device 150 may further explicitly or implicitly present additional information about these event evolutionary graphs, such as a correlation degree For event relationships. Referring to the example of FIG. 2C, a visual presentation 200C differs from the visual presentation 200B in that it further includes an indication of the correlation degree Corresponding to the event relationship. The meaning of the correlation degree is described below. In this example, these indications of the correlation degree are presented by numerical values. For example, the numerical value of the correlation degree Corresponding to the event relationship between the event represented by the node 205 and the event represented by the node 206 is 0.81. The numerical value of the correlation degree is labeled on the directed edge 217 between the two nodes. FIG. 2C further illustrates the correlation degrees of other event relationships, and its description is not repeated here.

In the example of FIG. 2C, the electronic device 150 explicitly presents the correlation degree as a numerical value. However, this is only exemplary. Alternatively, or additionally, in some embodiments, the correlation degree may be implicitly presented. The visual pattern of the presented directed edge may correspond to the correlation degree of the event relationship represented by the directed edge. For example, the thickness of the directed edge may depend on the correlation degree of the event relationship represented by it.

In this embodiment, by explicitly or implicitly presenting the correlation degree to the user, more information may be provided to the user. Such information is more conducive to assist the user in determining the possible direction of the event and/or possible causes.

Examples of visual presentation of media content are described above with reference to FIGS. 2A to 2C. One or more settings for visual presentation may be default or predetermined. Alternatively, or additionally, in some embodiments, one or more settings for visual presentation may be determined through user interaction. That is, users may customize the visual presentation of media content according to their own needs. Some such examples are described below.

In some embodiments, the number of hierarchies of the additional event evolutionary graph presented may be specified by the user. Accordingly, the electronic device 150 may present a corresponding number of hierarchies based on the number of hierarchies of the additional event evolutionary graph specified by the user input. Returning to the example of FIG. 2A, if the number of hierarchies specified is 2, two hierarchies of events are presented for the additional event evolutionary graph 220. For example, the additional event evolutionary graph 220 includes a node 205 representing a first-hierarchy event and a node 206 representing a second-hierarchy event. If the number of hierarchies specified is 1, the additional event evolutionary graph 220 only presents a first-hierarchy event. For example, the additional event evolutionary graph 220 includes only the node 205 representing first-hierarchy events. In this way, some associated events may be filtered, which helps users focus on the events of interest or relevance.

In some embodiments, the conditions or factors for extending the individual event evolutionary graph may be user-specified. Accordingly, the electronic device 150 may present additional event evolutionary graphs that meet the conditions or factors specified by the user input. As an example, the user may specify which event factor(s) to extend the individual event evolutionary graph based on. For example, if the user specifies extension based on time factors without considering other event factors, the electronic device 150 may present the additional event evolutionary graph 220 without presenting the additional event evolutionary graphs 230 and 240. In this way, it helps users quickly find events of interest or concern.

In some embodiments, the presentation of additional event evolutionary graphs is in response to a user's selection of event factors. Specifically, the electronic device 150 may receive a user's selection of an event factor and accordingly present an additional event evolutionary graph extended based on the event factor. For example, by default, the electronic device 150 initially presents only the individual event evolutionary graph 210 and the interface element representing the event factor. If the user selects the interface element of time, the electronic device 150 further presents the additional event evolutionary graph 220. The additional event evolutionary graph 220 is obtained by extending the individual event evolutionary graph 210 based on the time factor. If the user continues to select the interface element of industry, the electronic device 150 presents the additional event evolutionary graph 240. In this way, it helps the user selectively view events of interest.

In some embodiments, the presentation of the additional event evolutionary graph is in response to a user's selection of an event. Specifically, the electronic device 150 may receive a user's selection of a node and accordingly present the additional event evolutionary graph extended from that node. For example, the electronic device 150 presents one or more of the individual event evolutionary graph 210, interface elements representing event factors, and the additional event evolutionary graphs 220-240 extended based on event factors. If the user selects the node 201, the electronic device 150 presents the additional event evolutionary graph 250 (see FIG. 2B). The additional event evolutionary graph 250 is an extension of the individual event evolutionary graph 210 based on the event relationships. In this way, it helps users selectively view events of interest.

In some embodiments, the electronic device 150 may present an indication of the correlation degree based on the user's selection of the directed edge. For example, the electronic device 150 initially presents an individual event evolutionary graph, an interface element representing an event factor, and one or more additional event evolutionary graphs. If the user selects the directed edge 217, the electronic device 150 presents an indication of the correlation degree of the event relationship represented by the directed edge 217, i.e., a value of 0.81.

Figure 2B:
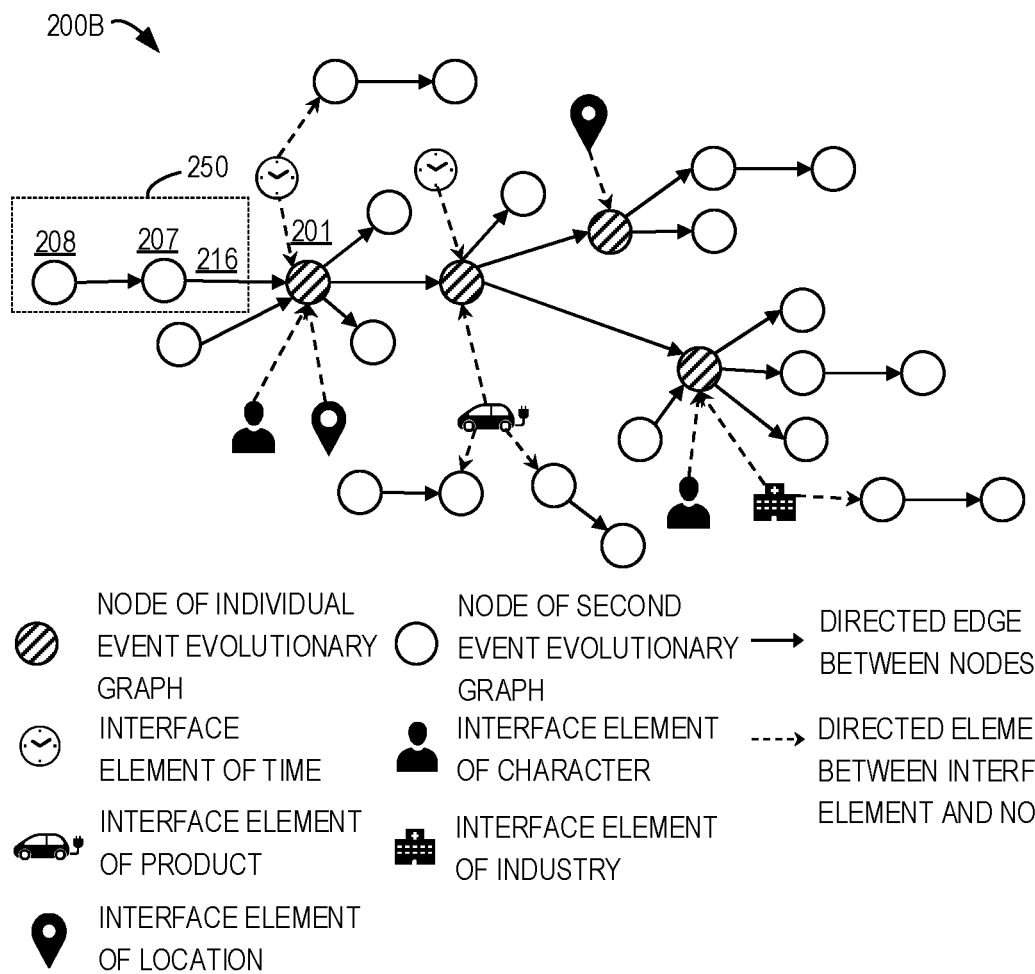
Figure 2C:
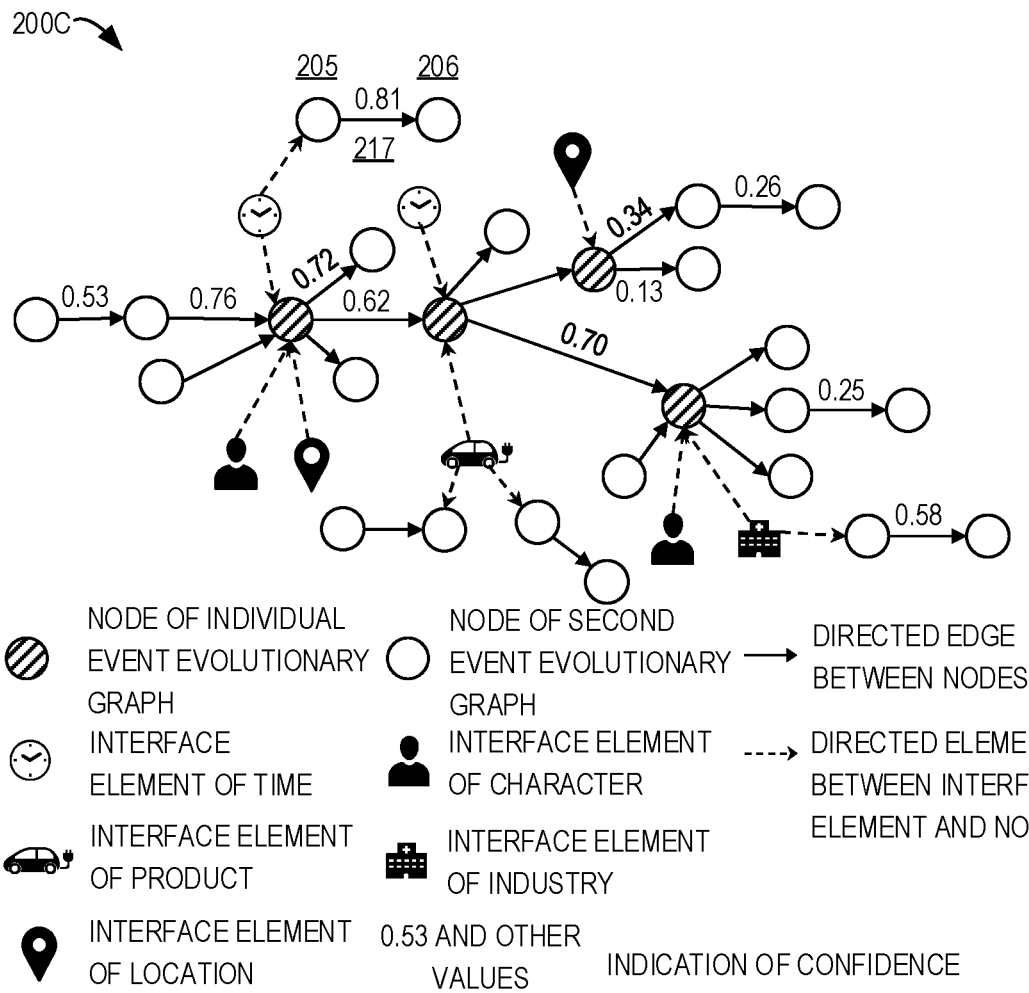

It should be understood that the presentation patterns shown in FIGS. 2A to 2C are exemplary only and are not intended to limit the scope of the disclosure. In some embodiments of the disclosure, the media content may be visually presented in any suitable pattern.

It can be seen from FIGS. 2A to 2C that the visual presentation 200A to 200C presented to the user by the electronic device 150 include different amounts of information, but they have intuitive and refined characteristics, which may improve the efficiency of the user in obtaining media information.

In the embodiments of the present disclosure, the presented individual event evolutionary graph and its extensions may be obtained in any suitable manner. Some examples are described below with reference to FIGS. 3 to 7, but it should be understood that the embodiments of the present disclosure are not limited in this respect.

Example Process for Building an Individual Event Evolutionary Graph

As mentioned above, at block 101, the electronic device 120 builds the individual event evolutionary graph of the media content 110. For example, one event evolutionary graph may be built for one news report.

Figure 3:
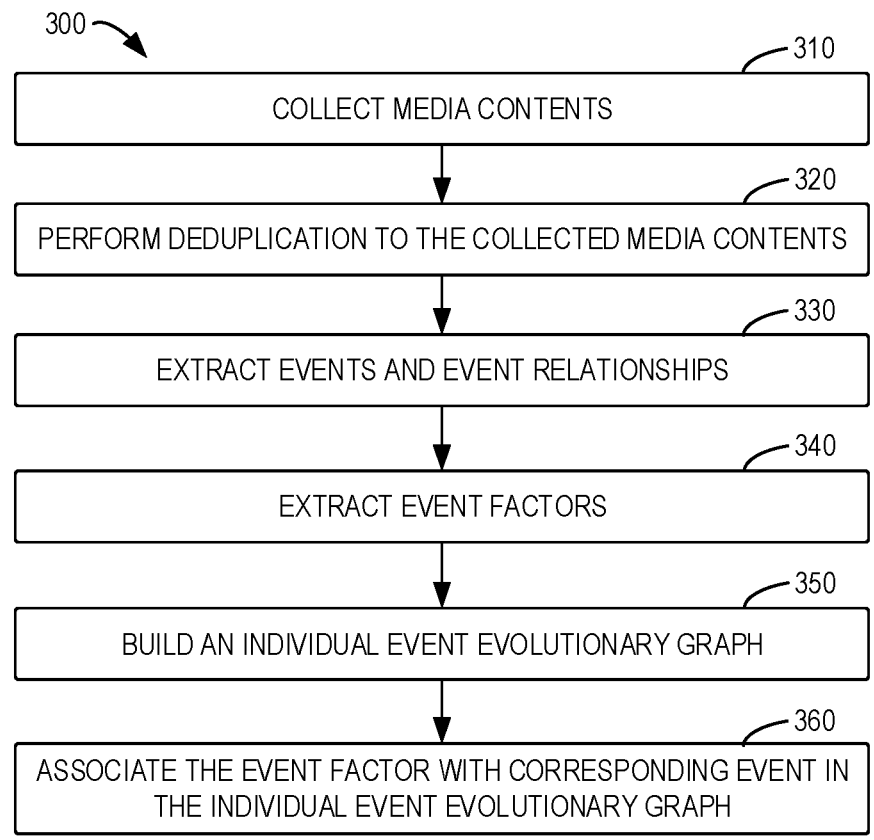
FIG. 3 illustrates a flowchart of a process of building an individual event evolutionary graph according to some embodiments of the present disclosure.

FIG. 3 shows a flow chart of a process 300 for building an individual event evolutionary graph according to some embodiments of the present disclosure. The process 300 may be regarded as an example implementation of block 101.

At block 310, the electronic device 120 collects media contents. The media contents may for example include current affairs news, social news, popular science information, etc. Taking news as an example of the media content 110, the electronic device 120 may collect news regularly through the interface provided by the website based on the list of news websites. The list of news websites includes mainstream news platforms, news platforms for specific industries, policy release platforms, knowledge sharing platforms, etc. The list of news websites may further be specified by the user.

At block 320, the electronic device 120 performs deduplication to the collected media contents. For example, the media content may be current affairs news, described as news collected from a list of news websites. News from different news websites may have mutual references and reprints, making the collected news possibly repetitive. The electronic device 120 may filter the collected news based on a deduplication algorithm.

In some embodiments, the electronic device 120 may use the Simhash algorithm to perform deduplication to the collected media contents. The deduplication process may include steps such as word segmentation, calculating hash values, weighting, merging, dimensionality reduction, and deduplication. Specifically, the electronic device 120 may perform word segmentation on text in the media content or text recognized or converted from the media content to obtain effective feature vectors, and then set weights for each feature vector. The electronic device 120 may calculate the hash value of each feature vector through a hash function and set weights for each feature vector. The electronic device 120 may further weight the feature vectors based on their hash values. Furthermore, the electronic device 120 may accumulate the weighted results of each feature vector to obtain a sequence string. The electronic device 120 determines each digit of the sequence string. For digits greater than 0, it is set to 1; for digits less than 0, it is set to 0. In this way, the electronic device 120 obtains the Simhash value corresponding to the media content. Finally, the electronic device 120 calculates a hash distance between any two media contents based on the Simhash value of each media content. If the hash distance is less than a predetermined threshold, the two media contents are considered duplicated. The electronic device 120 may remove one of the media contents, thereby achieving deduplication.

It should be understood that the Simhash algorithm is merely one example. In the embodiments of the present disclosure, any suitable algorithm may be utilized to achieve deduplication.

At block 330, the electronic device 120 extracts events and event relationships. Block 330 may be executed for any deduplicated media content or each media content. The electronic device 120 may automatically extract events and event relationships from the deduplicated media content based on an event extraction algorithm. One or more events may be extracted from a single media content. For a certain media content, events may not be extracted. The event relationships may include those described in FIG. 1A above. For example, in a news article about "enrich feed sources to address the problem of rising feed prices leading to increased breeding costs", the electronic device 120 may extract a first event "feed prices rising", a second event "breeding costs increasing", and a causal relationship between the two.

Additionally, in some embodiments, the electronic device 120 may further determine a correlation degree with respect to event relationships, also referred to herein as a correlation coefficient. The correlation degree may indicate the strength of the event relationship, the probability of event transition, or the credibility of the event relationship, etc. In some embodiments, the electronic device 120 may store the correlation degree of the event relationship represented by the directed edge in association with the directed edge.

At block 330, any suitable event extraction algorithm may be employed to extract events and event relationships. Examples of event extraction algorithms may include, but are not limited to, classification-based event extraction methods, sequence-labeled event extraction methods, reading comprehension-based event extraction methods, generation-based event extraction methods, and the like. The scope of the present disclosure is not limited in this regard.

As an example, the electronic device 120 may use an event extraction algorithm based on sequence annotation to extract events and event relationships. Continuing with the example of news text, the electronic device 120 may preprocess the deduplicated news text, such as filtering excess spaces, garbled characters, performing text segmentation, replacing interfering strings, and so on. The electronic device 120 may identify the starting and ending positions of the event by training a continuous event character sequence model on the preprocessed news text to obtain a descriptive fragment of the event, namely the event name. The event name usually includes a triggering word of the event, which specifies the event type of the event. Furthermore, the electronic device 120 may determine the event relationship between events based on the triggering word of the event, and then calculate the correlation degree between the events.

At block 340, the electronic device 120 extracts event factors. The electronic device 120 may extract event factors that the event has. The event factors may include, but are not limited to, event subject, event object, time, location, character, industry, company, and product. Depending on the amount of information in the media content, each event may have one or more event factors, or no event factors. For example, the event "breeding costs increasing" and its corresponding event factors are extracted from the news text. The event factors for the event "breeding costs increasing" may include a time factor "Apr. 1, 2022", an industry factor "breeding industry", and a location factor "XX county".

At block 350, the electronic device 120 generates an individual event evolutionary graph. Specifically, the electronic device 120 generates the individual event evolutionary graph based on the events and event relationships extracted at block 330. Continuing with the previous example regarding the breeding industry, the generated individual event evolutionary graph may include a node representing the first event "feed prices rising", a node representing the second event "breeding costs increasing", and a directed edge connecting these two nodes to represent the causal relationship between the two events. In this example, the directed edge points from the node representing the first event "feed prices rising" to the node representing the second event "breeding costs increasing".

Figure 4A:
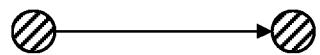
FIGS. 4A to 4F illustrate schematic diagrams of exemplary individual event evolutionary graphs built according to some embodiments of the present disclosure.
Figure 4B:
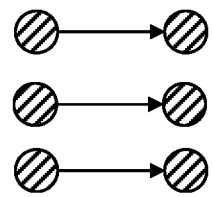
Figure 4C:
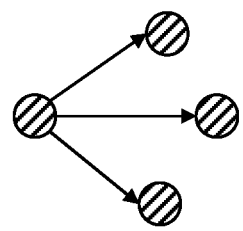
Figure 4D:
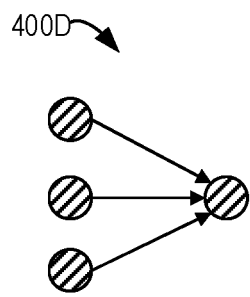
Figure 4E:
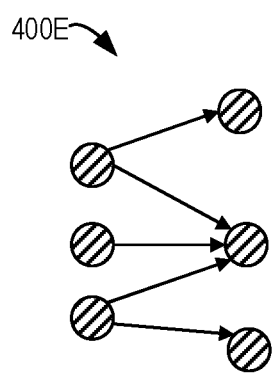
Figure 4F:
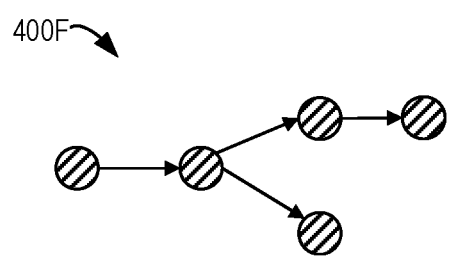

Depending on the specific media content, the built individual event evolutionary graph may have different structures. FIGS. 4A to 4F show schematic diagrams of example individual event evolutionary graphs built according to some embodiments of the present disclosure. An example individual event evolutionary graph 400A of FIG. 4A represents two extracted events and their corresponding event relationships. An example individual event evolutionary graph 400B of FIG. 4B represents six extracted events and their corresponding event relationships. These events are related to each other but isolated from each other. An example individual event evolutionary graph 400C of FIG. 4C and an example individual event evolutionary graph 400D of FIG. 4D respectively represent four extracted events and their corresponding event relationships. One event is associated with three other events. An example individual event evolutionary graph 400E of FIG. 4E and an example individual event evolutionary graph 400F of FIG. 4F represent five extracted events and their corresponding event relationships. One event has one to three association relationships with other events. In the above example, events in the individual event evolutionary graphs are represented by circles filled with slashes as nodes, and solid arrows as directed edges to represent the event relationships in the individual event evolutionary graphs. The pattern of the arrow may represent the type of event relationship, such as superior and inferior relationship, causal relationship, etc.

Figure 5:
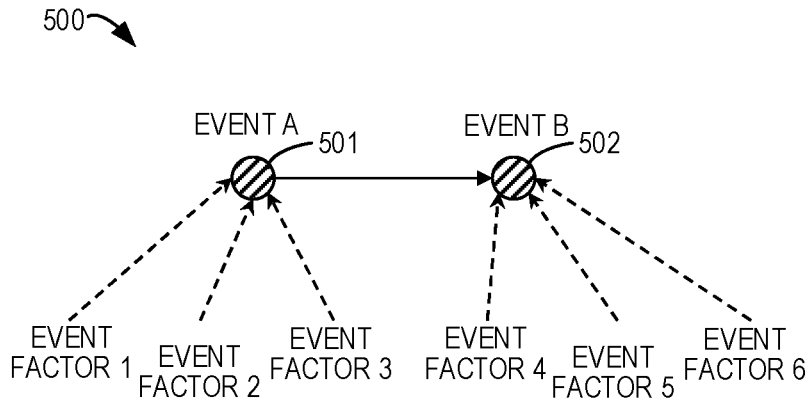
FIG. 5 illustrates a schematic diagram of associating event factors to an individual event evolutionary graph according to some embodiments of the present disclosure.

At block 360, the electronic device 120 associates the event factors with corresponding events in the individual event evolutionary graph. For example, the event factors of an event may be stored as attributes of the event in association with the node representing the event. FIG. 5 shows a schematic diagram of associating event factors with an individual event evolutionary graph according to some embodiments of the present disclosure. In the example of FIG. 5, the electronic device 120 extracts an event A represented by a node 501, an event B represented by a node 502, an event relationship between the event A and event B, and event factors corresponding to each event from the media content 110. Specifically, the electronic device 120 extracts event factors 1, 2, and 3 corresponding to the event A, and extracts event factors 4, 5, and 6 corresponding to the event B. Correspondingly, the event factors 1, 2, and 3 are associated with the node 501 representing the event A, and the event factors 4, 5, and 6 are associated with the node 502 representing the event B.

The above describes the example process for building the individual event evolutionary graph with reference to the process 300. It should be understood that this is only exemplary and that the individual event evolutionary graph may be built in any suitable manner in the embodiments of the present disclosure. In addition, the patterns of events, event relationships, event numbers, event factors, and event evolutionary graphs described in the reference process 300 are only exemplary and are not intended to limit the scope of the present disclosure.

Example of Updating a Reference Event Evolutionary Graph

As described above with reference to FIG. 2, in some embodiments, at block 102, the electronic device 120 may utilize an individual event evolutionary graph to update the reference event evolutionary graph. Herein, updating the reference event evolutionary graph may also be referred to as merging the individual event evolutionary graph with the reference event evolutionary graph. The merging may refer to merging one or more nodes in the individual event evolutionary graph with one or more nodes in the reference event evolutionary graph or adding the individual event evolutionary graph itself to the reference event evolutionary graph as part of it. The specific operation is exemplary only and is not intended to limit the scope of the present disclosure. Therefore, the individual event evolutionary graph may be regarded as a subgraph of the event evolutionary graph relative to the reference event evolutionary graph or the global event evolutionary graph.

The reference event evolutionary graph may be the merged event evolutionary graph generated from a large amount of media content for specific industries, fields, or websites. The reference event evolutionary graphs may describe the relationships between various events from a global perspective. The following describes an example of updating a reference event evolutionary graph.

In some embodiments, the electronic device 120 may calculate a similarity between events in the individual event evolutionary graph and events in the reference event evolutionary graph in order to merge the individual event evolutionary graph with the reference event evolutionary graph. Then, the individual event evolutionary graph and the reference event evolutionary graph may be merged based on the similarity. The electronic device 120 may calculate the similarity between events based on event names, event factors, and the like.

As an example, the electronic device 120 may determine the similarity between events based on Jaccard similarity. Continuing with the example in FIG. 5, the electronic device 120 compares the event A in the individual event evolutionary graph with another event in the reference event evolutionary graph. The name and factors of the event A are segmented to obtain a first segmentation set for the event A. The electronic device 120 segments the names and factors of the events to be compared in the reference event evolutionary graph to obtain a second segmentation set. Based on the first segmentation set and the second segmentation set, the electronic device 120 determines the number of words in the intersection of these two sets and the number of words in the union of these two sets. Furthermore, the electronic device 120 calculates a ratio of the number of words in the intersection to the number of words in the union to obtain Jaccard similarity. The electronic device 120 merges the individual event evolutionary graph and the reference event evolutionary graph based on the Jaccard similarity.

The electronic device 120 may merge the individual event evolutionary graph and the reference event evolutionary graph based on a relationship between the similarity and one or more predetermined thresholds. In some embodiments, two thresholds may be predetermined, namely a first threshold and a second threshold, and the first threshold is greater than the second threshold. If the similarity between the two events being compared is greater than the first threshold, the two events may be considered the same. Correspondingly, the electronic device 120 may merge the nodes in the individual event evolutionary graph with the corresponding nodes in the reference event evolutionary graph without adding new nodes in the reference event evolutionary graph. If the similarity between the two events is less than the second threshold, the two events may be considered independent of each other. Correspondingly, the electronic device 120 adds the nodes in the individual event evolutionary graph to the reference event evolutionary graph to achieve the evolutionary graph merging. If the similarity between the two events is between the first threshold and the second threshold, the two events may be considered as similar events. Correspondingly, the electronic device 120 may add nodes in the individual event evolutionary graph to the reference event evolutionary graph and establish indications of similarity relationships for similar events (e.g., represented by directed edges of different patterns).

Figure 6A:
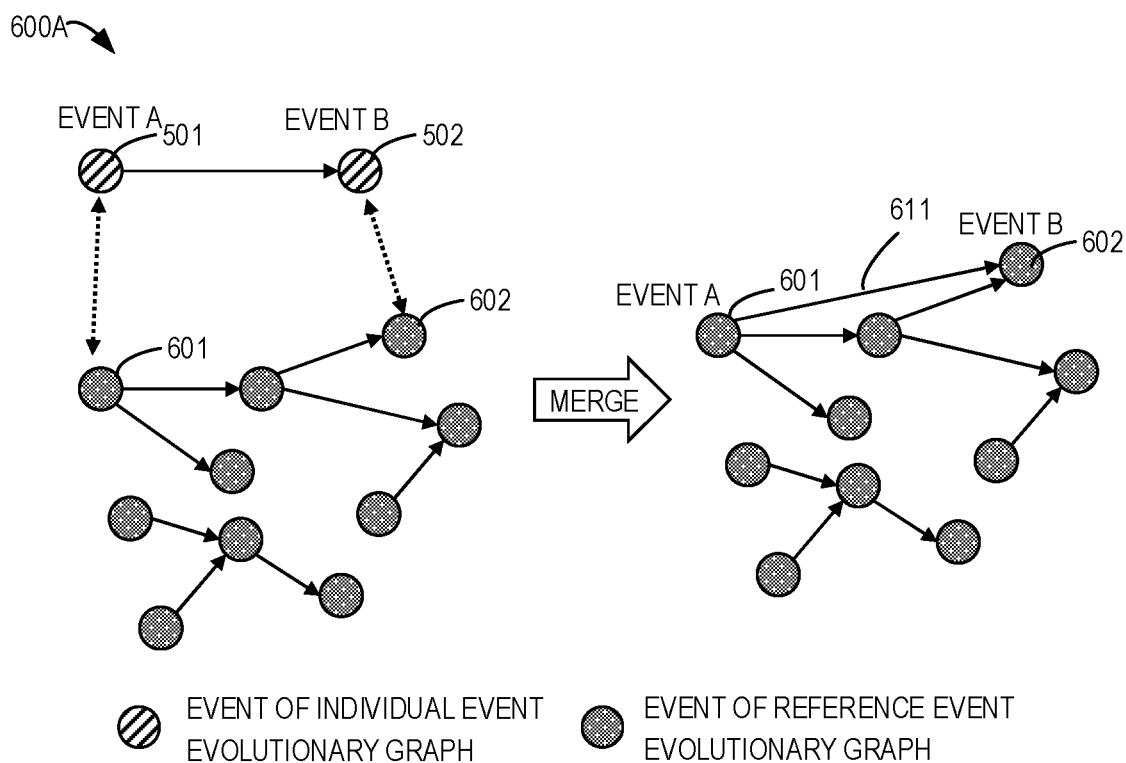
FIGS. 6A to 6C illustrate examples of updating reference event evolutionary graphs according to some embodiments of the present disclosure.
Figure 6B:
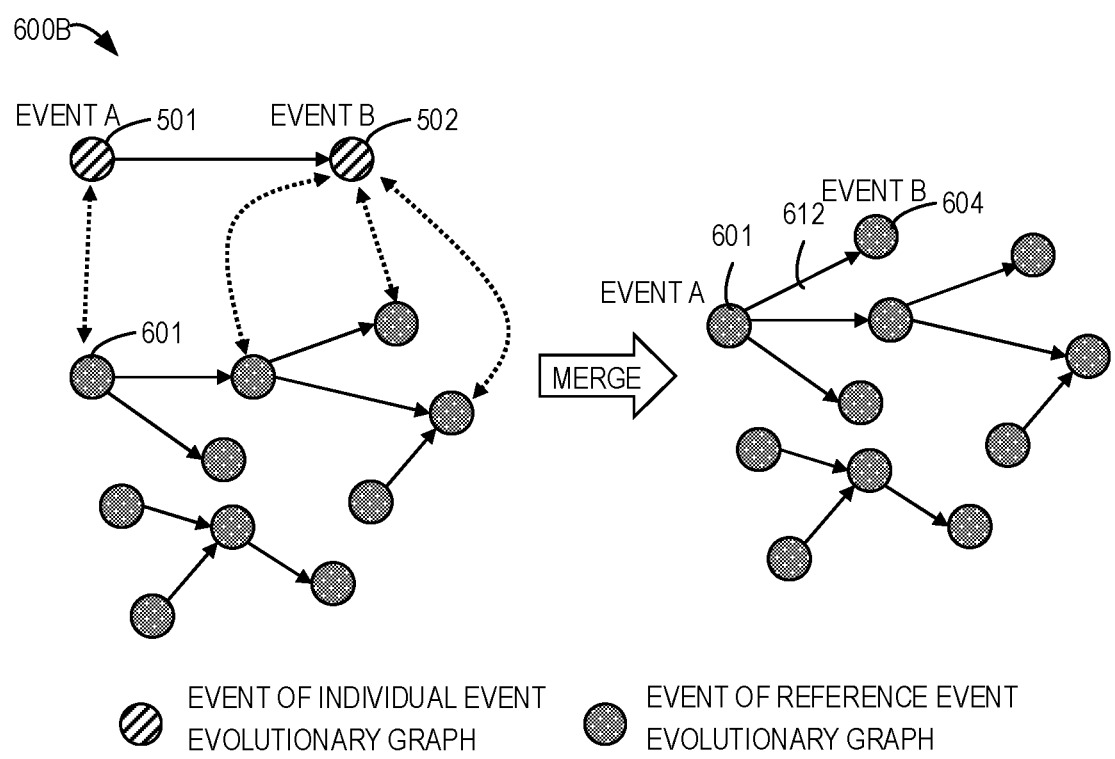
Figure 6C:
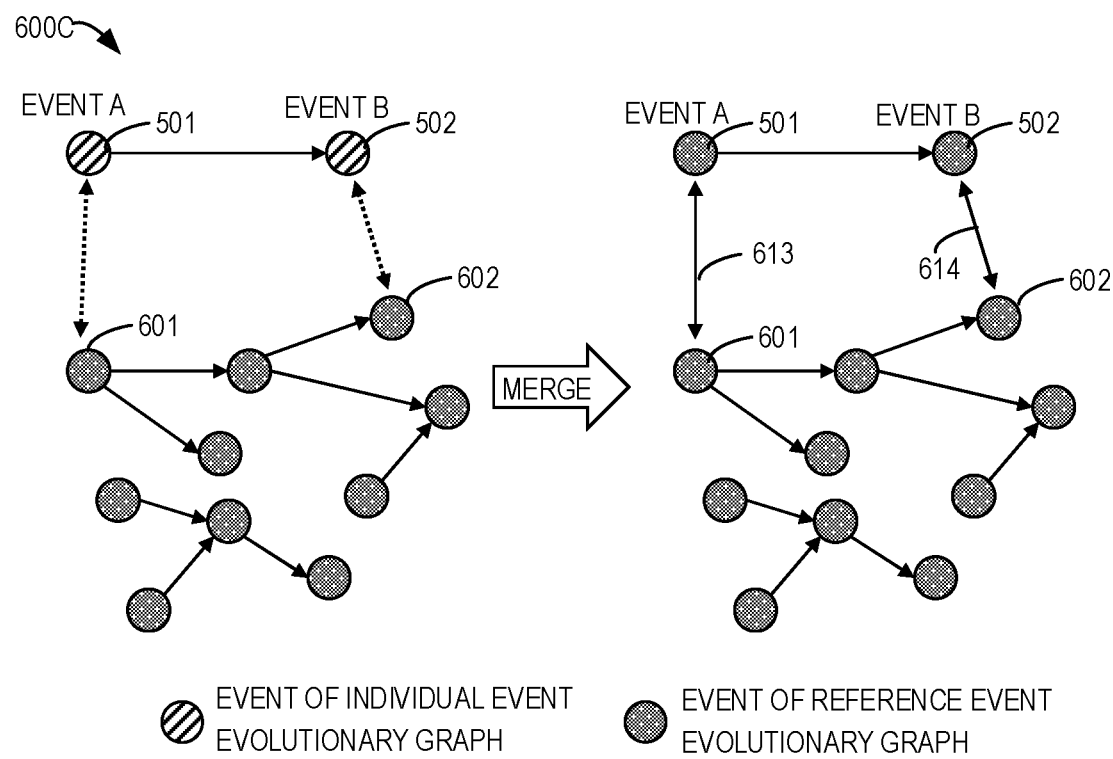

FIGS. 6A to 6C illustrate examples of updating reference event evolutionary graph according to some embodiments of the present disclosure.

In the example of FIG. 6A, the individual event evolutionary graph includes the node 501 representing the event A and the node 502 representing the event B. The electronic device 120 performs traversal calculation on the similarity between the event A and event B and the events represented by each node in the reference event evolutionary graph (dashed arrows are used in the figure to indicate the similarity calculation between the two events, but not all dashed arrows for traversal calculation are shown). The similarity between the event A and the event represented by a node 601 in the reference event evolutionary graph is greater than the first threshold (e.g., 0.9). The electronic device 120 merges the node 501 with the node 601. The similarity between the event B and the event represented by a node 602 in the reference event evolutionary graph is also greater than the first threshold (e.g., 0.9). The electronic device 120 merges the node 502 with the node 602. In order to preserve the original relationship between the event A and event B, a directed edge 611 pointing from the node 601 to node 602 is added to the reference event evolutionary graph. As shown in the figure, after merging, no new nodes are added to the reference event evolutionary graph, but the directed edge is added between the event A and event B.

In the example of FIG. 6B, the electronic device 120 performs traversal calculation on the similarity between the event A and event B in the individual event evolutionary graph and each event in the reference event evolutionary graph (only part of dashed arrows of the traversal calculation is shown in the figure). The similarity between the event A and the event represented by the node 601 in the reference event evolutionary graph is greater than the first threshold (e.g., 0.9). The electronic device 120 merges the node 501 with the node 601. The similarity between the event B and the event represented by each node in the reference event evolutionary graph is less than the second threshold (e.g., 0.6). The electronic device 120 adds a node 604 representing the event B to the reference event evolutionary graph. Correspondingly, in order to preserve the original relationship between the event A and event B, a directed edge 612 pointing from the node 601 to node 604 is added to the reference event evolutionary graph. After merging, a new node is added to the reference event evolutionary graph, and the directed edge between the event A and event B is added.

In the example of FIG. 6C, the electronic device 120 performs a traversal calculation of similarity between the event A and event B in the individual event evolutionary graph and each event in the reference event evolutionary graph (only part of dashed arrow of the traversal calculation is shown in the figure). The similarity between the event A and the event represented by node 601 in the reference event evolutionary graph is between the first and second thresholds. Correspondingly, the electronic device 120 adds the node 501 to the reference event evolutionary graph and adds a directed edge 613 (which is a bidirectional edge) between the node 501 and node 601 to indicate a similarity relationship between the event A and the event represented by the node 601. The similarity between the event B and the event represented by the node 602 in the reference event evolutionary graph is also between the first and second thresholds. Correspondingly, the electronic device 120 adds the node 502 to the reference event evolutionary graph and adds a directed edge 614 (which is a bidirectional edge) between the node 502 and node 602 to indicate a similarity relationship between the event B and the event represented by the node 602. After merging, a new node is added to the reference event evolutionary graph and indications of similarity relationships are established between the event A and similar events and between the event B and similar events.

The updating process of the reference event evolutionary graph described above may be regarded as the incremental construction of the reference event evolutionary graph. This incremental construction may be used for the initial creation of the reference event evolutionary graph or for incremental updates to the already created reference event evolutionary graph. By continuously merging new added individual event evolutionary graphs into the reference event evolutionary graph, the reference event evolutionary graph may be continuously updated. In this way, a rich and comprehensive event chain and event relationship network may be formed.

Example of Extending an Individual Event Evolutionary Graph

As described above with reference to FIG. 1B, at block 103, the electronic device 120 extends the individual event evolutionary graph. Specifically, one or more subgraphs may be determined from the reference event evolutionary graph as one or more additional event evolutionary graphs based on the factors considered for extension. Furthermore, one or more additional event evolutionary graphs may be combined with the individual event evolutionary graph to generate an extended individual event evolutionary graph.

In some embodiments, the individual event evolutionary graph may be extended based on event factors. To help users obtain richer information, events with matching event factors may be found in the reference event evolutionary graph based on the event factors corresponding to the event, and the individual event evolutionary graph may be extended based on the event.

Specifically, for a certain event factor of an event included in the individual event evolutionary graph, events with matching event factors may be found in the reference event evolutionary graph, which may also be referred to as matching events. Herein, matching two event factors may mean that these two event factors are the same or similar. Similarity may mean that the difference between these two event factors is less than a threshold difference. For example, for time factors, if the difference between two specific time values is less than the threshold difference, it may be considered that these two time factors match. Matching two event factors may further mean that the two event factors have corresponding characteristics. For example, for product factors, the commonly used "plug" and "socket" may have matching product factors. Continuing with the example of breeding industry, the event factor corresponding to the event "breeding costs increasing" includes the industry factor "breeding industry". The electronic device 120 may determine the event "large-scale breeding" with the industry factor based on the industry factor "breeding industry" from the reference event evolutionary graph and use it as a matching event.

After determining the matching event, the additional event evolutionary graph may be determined based on the matching event, and the additional event evolutionary graph may be combined with the individual event evolutionary graph. In this way, the extension of the individual event evolutionary graph is achieved. The combination of the additional event evolutionary graph and the individual event evolutionary graph may be achieved through matching event factors.

The additional event evolutionary graph may have any suitable number of hierarchies. For example, nodes representing matching events may be added to the individual event evolutionary graph as an additional event evolutionary graph. That is, in this case, one hierarchy of extension is performed.

In some embodiments, the electronic device 120 may determine the number of hierarchies to be extended. The number of hierarchies to be extended may be predetermined or may be specified by a user input. Then, a subgraph with the number of hierarchies may be determined by starting from nodes representing matching events in the reference event evolutionary graph. The subgraph serves as an additional event evolutionary graph and is combined with the individual event evolutionary graph. For example, in the case where the number of hierarchies to be extended is 2, the electronic device 120 may determine from the reference event evolutionary graph a node representing a matching event and a node directly connected to the node (if any) as an additional event evolutionary graph.

Based on the individual event evolutionary graph and extended based on event factors, it is possible to determine related events and their evolution rules with the same, similar, or corresponding factors. In this way, richer information may be provided to users. Based on events that match the same event subject or industry, the cause, development, or impact of the first and/or second events may be analyzed.

Figure 7A:
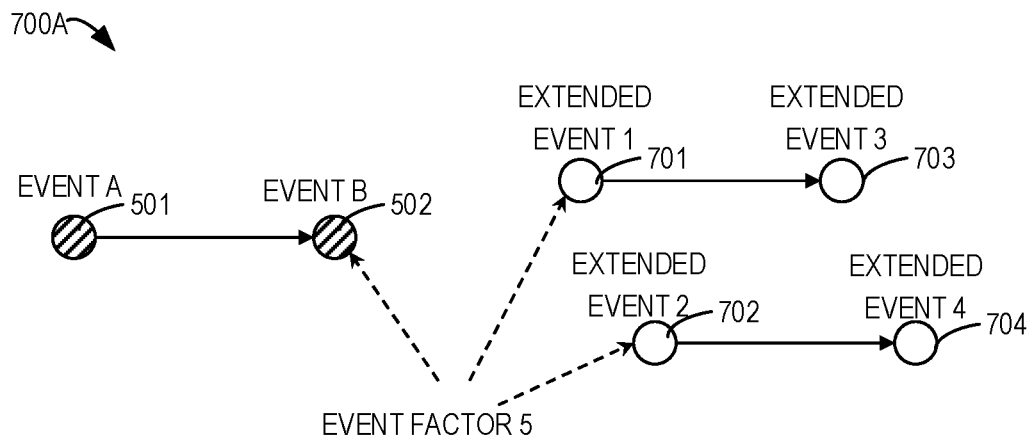
FIGS. 7A to 7C illustrate examples of extended individual event evolutionary graphs according to some embodiments of the present disclosure.

FIG. 7A illustrates an individual event evolutionary graph 700A extended based on event factors according to some embodiments of the present disclosure. The example of FIG. 7A is described in conjunction with FIG. 5. The individual event evolutionary graph includes the event A and event B. The event B has an event factor 5 as described with reference to FIG. 5.

In the example of FIG. 7A, the electronic device 120 extends the individual event evolutionary graph based on the event factor 5. The electronic device 120 finds an extended event 1 and an extended event 2 with event factors matching the event factor 5 in the reference event evolutionary graph. Therefore, at least a node 701 representing an extended event 1 and a node 702 representing an extended event 2 are added to the individual event evolutionary graph. Additionally or alternatively, the electronic device 120 may extend the individual event evolutionary graph based on pre-set or user-set extension hierarchies. For example, if obtaining two-hierarchy extension events is set, the electronic device 120 finds an extended event 3 associated with the extended event 1. Thus, a subgraph including the node 701 and the node 703 representing an extended event 3 is added to the individual event evolutionary graph and associated with the event B via the event factor 5. In addition, the electronic device 120 further finds an extended event 4 associated with the extended event 2. Thus, a subgraph including the node 702 and the node 704 representing an extended event 4 is added to the individual event evolutionary graph and associated with the event B via the event factor 5.

As an example without any limitation, the event A may be "feed prices rising" and the event B may be "breeding costs increasing". The event factor 5 of the event B may be the industry factor "breeding industry". Then, an extended event 1 "loss in pig breeding" and the extended event 2 "large-scale breeding" may be found. Furthermore, the electronic device 120 finds the extended event 3 "significant decline in profits" associated with the extended event 1, and the extended event 4 "high industrialization conversion rate" associated with the extended event 2. In this example, based on the industry factor "breeding industry", it is extended to facilitate users in obtaining related events in the same industry, so as to understand the recent trends of the industry.

Alternatively or additionally, in some embodiments, the electronic device 120 may extend the individual event evolutionary graph based on event relationships. Specifically, for a certain event represented by a node in the individual event evolutionary graph, events related to the event may be found in the reference event evolutionary graph. Then, a certain number of hierarchical extensions may be made based on the found events. In this way, the user may help sort out the ins and outs of the event. The event relationships used here include, but are not limited to, those described with reference to FIG. 1A.

Figure 7B:
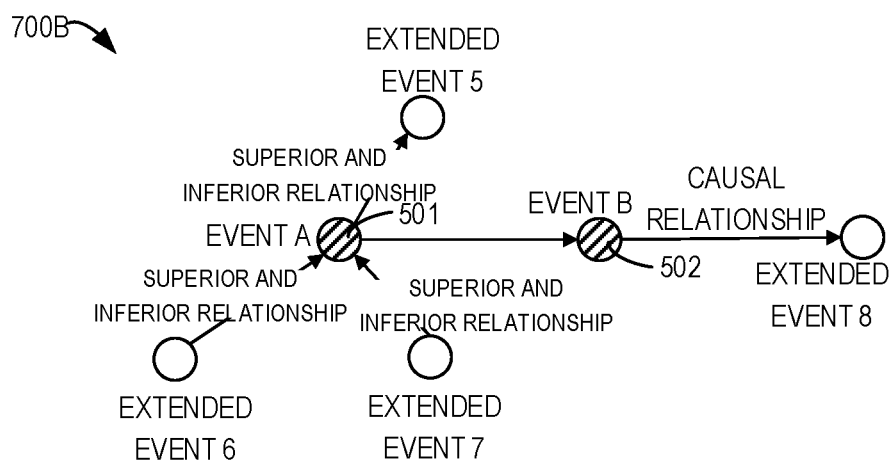

FIG. 7B illustrates an individual event evolutionary graph 700B extended based on event relationships according to some embodiments of the present disclosure. The example of FIG. 7B is described in conjunction with FIG. 5. The individual event evolutionary graph includes the event A and B.

In the example of FIG. 7B, the electronic device 120 finds the extended event 5 that has a superior and inferior relationship with the event A from the reference event evolutionary graph. Correspondingly, a node representing the extended event 5 and a directed edge representing the event evolutionary graph relationship between the event A and the extended event 5 may be added to the individual event evolutionary graph for extension. For example, the event A may be "feed prices rising", while the extended event 5 may be "food prices rising". The extended events 6 and 7 that have a superior and inferior relationship with the event A may further be found from the reference event evolutionary graph, such as "chicken feed prices rising" and "pig feed prices rising", respectively. Correspondingly, a node representing the extended event 6 and a directed edge representing the superior and inferior relationship between the event A and the extended event 6 may be added to the individual event evolutionary graph for extension. In addition, a node representing the extended event 7 and a directed edge representing the superior and inferior relationship between the event A and the extended event 7 may further be added to the individual event evolutionary graph for extension. The electronic device 120 finds the extended event 8 that has a causal relationship with the event B in the reference event evolutionary graph, such as "revenue decreasing". Accordingly, a node representing the extended event 8 and a directed edge representing the causal relationship between the event B and the extended event 8 may be added to the individual event evolutionary graph for extension.

Figure 7C:
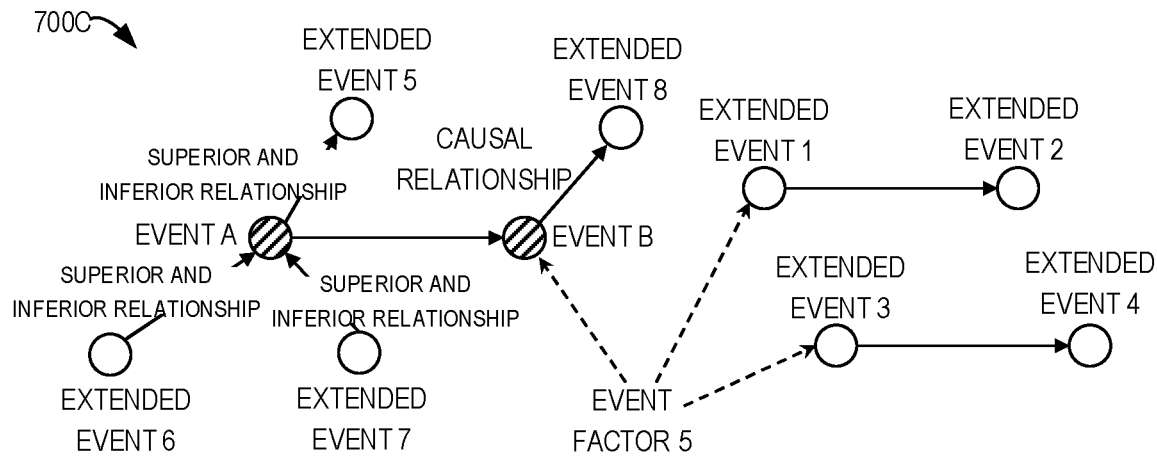

In some embodiments, the electronic device 120 may extend the individual event evolutionary graph based on event relationships and event factors. FIG. 7C shows an individual event evolutionary graph 700C extended based on event relationships and event factors according to some embodiments of the present disclosure. The event evolutionary graph 700C may be viewed as a superposition of the event evolutionary graph 700A and the event evolutionary graph 700B. Specifically, the extended individual event evolutionary graph includes nodes representing the extended events 1 to 4 based on the event factors, and nodes representing extended events 5 to 8 based on the event relationships.

The examples for extension are described above with reference to FIGS. 7A to 7C. It should be understood that the number of nodes, the relationships between events, and the patterns of the event evolutionary graph shown in these figures are only exemplary and are not intended to limit the scope of this disclosure. In addition, the extension based on which or which event factor(s) may be default or user selected. Alternatively or additionally, the extension based on which or which event relationship(s) may be default or user-selected.

In summary, according to various embodiments of the present disclosure, the electronic device 120 may automatically extract events, event relationships, and event factors contained in all media content 110 within a specified range, and establish a reference event evolutionary graph. The electronic device 120 may further automatically extract events, event relationships, and event factors contained in specific media content 110 to build an individual event evolutionary graph. The electronic device 120 may further merge the individual event evolutionary graph with the reference event evolutionary graph to achieve dynamic updating of the reference event evolutionary graph and facilitate the extension of the individual event evolutionary graph. Furthermore, the electronic device 120 may match events from the reference event evolutionary graph based on event factors and/or event relationships for extending the individual event evolutionary graph. In this way, it may help users efficiently obtain intuitive and refined media information in the form of an event evolutionary graph, and may also help users gain in-depth insight into events, analyze the causes of events, predict the subsequent effects of events, and so on.

Example Processes

Figure 8A:
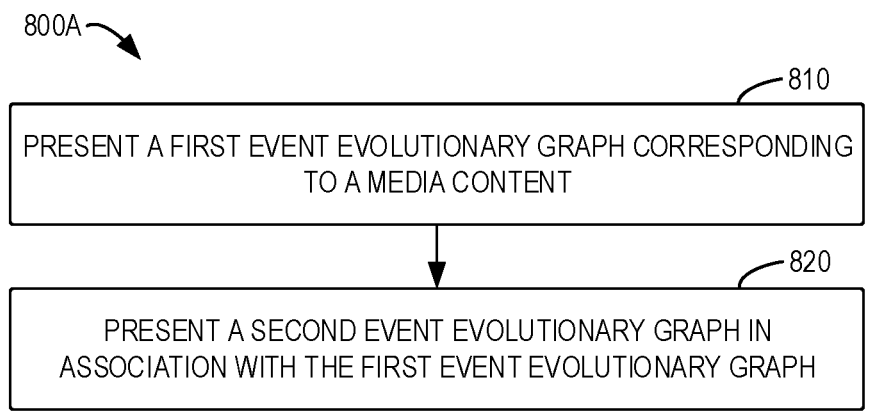
FIG. 8A illustrates a flowchart of a process of information presenting according to some embodiments of the present disclosure.

FIG. 8A illustrates a flow chart of a process 800A of information presenting according to some embodiments of the present disclosure. The process 800A may be implemented at the electronic device 150.

At block 810, the electronic device 150 presents a first event evolutionary graph corresponding to a media content. The first event evolutionary graph comprises at least a first node representing a first event, a second node representing a second event, and a first directed edge representing a first event relationship between the first event and the second event. The first event, the second event, and the first event relationship are determined from the media content.

At block 820, the electronic device 150 presents a second event evolutionary graph in association with the first event evolutionary graph. The second event evolutionary graph comprising at least a third node representing a third event, a first event factor of at least one event of the first event or the second event matching a second event factor of the third event.

In some embodiments, the process 800A further comprises: the electronic device 150 associates the second event evolutionary graph with the first event evolutionary graph visually through an interface element representing the first event factor.

In some embodiments, the process 800A further comprises: the electronic device 150 presents a first directed element pointing from the interface element to a node in the first event evolutionary graph representing the at least one event; and presents a second directed element pointing from the interface element to the third node.

In some embodiments, the process 800A further comprises: the electronic device 150 presents a plurality of interface elements representing a plurality of event factors, respectively, each event factor belonging to at least one event of the first event or the second event, and the plurality of event factors comprising the first event factor.

In some embodiments, the process 800A further comprises: the electronic device 150 receives a selection of an interface element of the plurality of interface elements, and presenting the second event evolutionary graph in association with the first event evolutionary graph is in response to an interface element representing the first event factor being selected.

In some embodiments, the process 800A further comprises: the electronic device 150 presents a fourth node representing a fourth event having a second event relationship with the first event; and present, between the first node and the fourth node, a second directed edge representing the second event relationship.

In some embodiments, the process 800A further comprises at least one of: the electronic device 150 presents an indication of a correlation degree For the first event relationship, or presents the first directed edge in a visual pattern corresponding to the correlation degree.

In some embodiments, the process 800A further comprises: the electronic device 150 receives a user input specifying the number of hierarchies to be extended for the first event factor, and the presented second event evolutionary graph has the specified number of hierarchies.

In some embodiments, the second event evolutionary graph is determined by: determining a subgraph with the number of hierarchies as the second event evolutionary graph by starting from a node representing the third event in a reference event evolutionary graph.

In some embodiments, the third node has a visual effect different with the first node and second node.

Figure 8B:
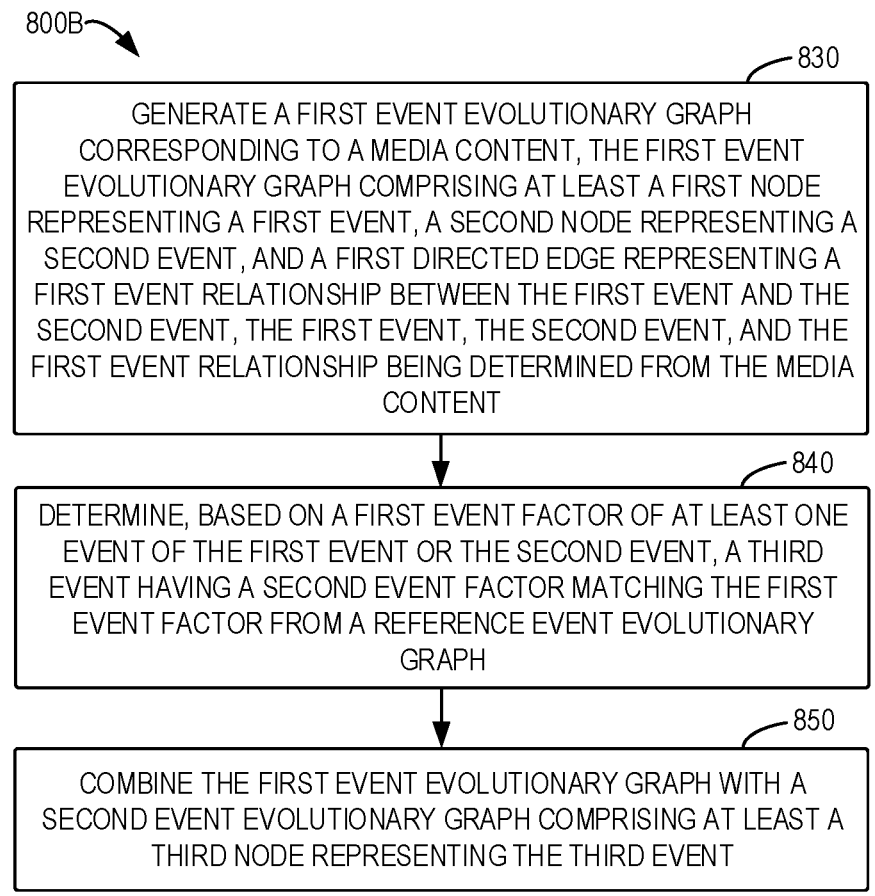
FIG. 8B illustrates a flowchart of a process of information processing according to some embodiments of the present disclosure.

FIG. 8B illustrates a flowchart of a process 800B of information processing according to some embodiments of the present disclosure. The process 800B may be implemented at the electronic device 120.

At block 830, the electronic device 120 generates a first event evolutionary graph corresponding to a media content. The first event evolutionary graph comprises at least a first node representing a first event, a second node representing a second event, and a first directed edge representing a first event relationship between the first event and the second event. The first event, the second event, and the first event relationship are determined from the media content.

In block 840, the electronic device 120 determines, based on a first event factor of at least one event of the first event or the second event, a third event having a second event factor matching the first event factor from a reference event evolutionary graph.

At block 850, the electronic device 120 combines the first event evolutionary graph with a second event evolutionary graph comprising at least a third node representing the third event.

In some embodiments, the process 800B further comprises: the electronic device 120 determines, from the reference event evolutionary graph, a fourth event having a second event relationship with the first event; add a fourth node representing the fourth event to the first event evolutionary graph; and add, between the first node and the fourth node, a second directed edge representing the second event relationship.

In some embodiments, the process 800B further comprises: the electronic device 120 stores a correlation degree For the first event relationship in association with the first directed edge.

In some embodiments, the second event evolutionary graph is determined by: determining the number of hierarchies to be extended for the first event factor; and determining a subgraph with the number of hierarchies as the second event evolutionary graphs by tarting from a node representing the third event in the reference event evolutionary graph.

In some embodiments, the number is specified by a user input.

In some embodiments, the process 800B further comprises: the electronic device 120 determines a first similarity between the first event and a fifth event represented by a fifth node in the reference event evolutionary graph, and a second similarity between the second event and a sixth event represented by a sixth node in the reference event evolutionary graph; and updates the reference event evolutionary graph based on the first similarity, the second similarity, a first threshold, and a second threshold below the first threshold.

In some embodiments, the process 800B further comprises: the electronic device 120, in response to the first similarity exceeding the first threshold and the second similarity exceeding the first threshold, adds, between the fifth node and the sixth node, a directed edge representing the first event relationship.

In some embodiments, the process 800B further comprises: the electronic device 120, in response to the first similarity exceeding the first threshold and the second similarity being below the second threshold, adds a seventh node representing the second event to the reference event evolutionary graph; and adds, between the fifth node and the seventh node, a directed edge representing the first event relationship.

In some embodiments, the process 800B further comprises: the electronic device 120, in response to both the first similarity and the second similarity being between the first threshold and the second threshold, adds the first event evolutionary graph to the reference event evolutionary graph; and adds, to the reference event evolutionary graph, an indication that the first event is similar to the fifth event and an indication that the second event is similar to the sixth event.

In some embodiments, the process 800B further comprises: the electronic device 120, in response to the media content being presented or selected, presents the combined first event evolutionary graph and second event evolutionary graph.

Example Device

Figure 9:
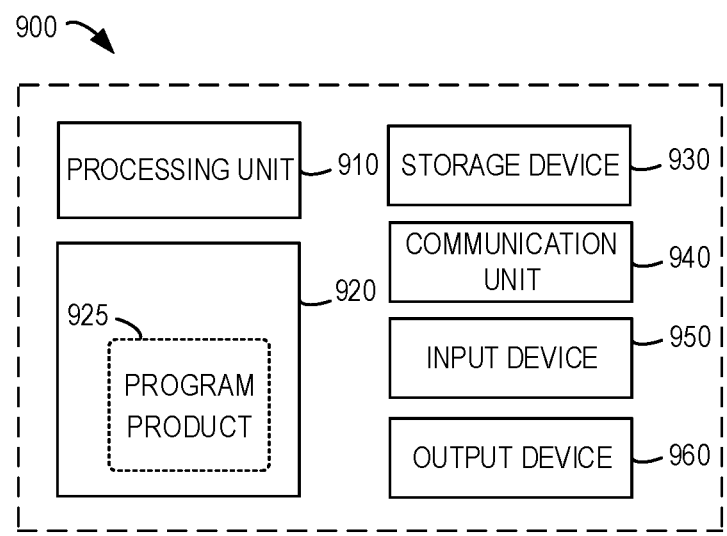
FIG. 9 illustrates a block diagram of an electronic device capable of implementing a plurality of embodiments of the present disclosure.

FIG. 9 illustrates a block diagram of an electronic device 900 in which a plurality of embodiments of the present disclosure may be implemented. It should be understood that the electronic device 900 shown in FIG. 9 is merely exemplary and should not constitute any limitation on the functionality and scope of the embodiments described herein. The electronic device 900 shown in FIG. 9 may be used to implement the electronic device 120 and/or the electronic device 150 in FIG. 1.

As shown in FIG. 9, the electronic device 900 is in the form of a general electronic device. The components of electronic device 900 may include, but are not limited to, one or more processors or processing units 910, a memory 920, a storage device 930, one or more communication units 940, one or more input devices 950, and one or more output devices 960. The processing unit 910 may be an actual or virtual processor and can execute various processes based on the programs stored in the memory 920. In a multiprocessor system, multiple processing units execute computer executable instructions in parallel to improve the parallel processing capability of the electronic device 900.

The electronic device 900 typically includes multiple computer storage medium. Such medium may be any available medium that is accessible to the electronic device 900, including but not limited to volatile and non-volatile medium, removable and non-removable medium. The memory 920 may be volatile memory (for example, a register, cache, a random-access memory (RAM)), a non-volatile memory (for example, a read-only memory (ROM), an electrically erasable programmable read-only memory (EEPROM), a flash memory), or any combination thereof. The storage device 930 may be any removable or non-removable medium and may include a machine-readable medium such as a flash drive, a disk, or any other medium, which may be used to store information and/or data (such as training data for training) and may be accessed within the electronic device 900.

The electronic device 900 may further include additional removable/non-removable, volatile/non-volatile storage medium. Although not shown in FIG. 9, a disk driver for reading from or writing to a removable, non-volatile disk (such as a "floppy disk"), and an optical disk driver for reading from or writing to a removable, non-volatile optical disk may be provided. In these cases, each driver may be connected to the bus (not shown) by one or more data medium interfaces. The memory 920 may include a computer program product 925, which has one or more program units configured to perform various methods or acts of various implementations of the present disclosure.

The communication unit 940 communicates with a further electronic device through the communication medium. In addition, functions of components in the electronic device 900 may be implemented by a single computing cluster or multiple computing machines, which can communicate through a communication connection. Therefore, the electronic device 900 may be operated in a networking environment using a logical connection with one or more other servers, a network personal computer (PC), or another network node.

The input device 950 may be one or more input devices, such as a mouse, a keyboard, a trackball, etc. The output device 960 may be one or more output devices, such as a display, a speaker, a printer, etc. The electronic device 900 may also communicate with one or more external devices (not shown) through the communication unit 940 as required. The external device, such as a storage device, a display device, etc., communicate with one or more devices that enable users to interact with the electronic device 900, or communicate with any device (for example, a network card, a modem, etc.) that makes the electronic device 900 communicate with one or more other electronic devices. Such communication may be executed via an input/output (I/O) interface (not shown).

According to example implementation of the present disclosure, a computer-readable storage medium is provided, on which a computer-executable instruction or computer program is stored, wherein the computer-executable instructions is executed by the processor to implement the method described above. According to example implementation of the present disclosure, a computer program product is also provided. The computer program product is physically stored on a non-transient computer-readable medium and includes computer-executable instructions, which are executed by the processor to implement the method described above.

The following are some implementations of the present disclosure.

In a first aspect, the present disclosure provides a method for presenting information. The method includes presenting a first event evolutionary graph corresponding to a media content. The first event evolutionary graph includes at least a first node representing a first event, a second node representing a second event, and a first directed edge representing a first event relationship between the first event and the second event. The first event, the second event, and the first event relationship are determined from the media content. The method further includes presenting a second event evolutionary graph in association with the first event evolutionary graph. The second event evolutionary graph comprises at least a third node representing a third event. A first event factor of at least one event of the first event or the second event matches a second event factor of the third event.

In some embodiments of the first aspect, presenting the second event evolutionary graph in association with the first event evolutionary graph comprises: associating the second event evolutionary graph with the first event evolutionary graph visually through an interface element representing the first event factor.

In some embodiments of the first aspect, associating the second event evolutionary graph with the first event evolutionary graph visually comprises: presenting a first directed element pointing from the interface element to a node in the first event evolutionary graph representing the at least one event; and presenting a second directed element pointing from the interface element to the third node.

In some embodiments of the first aspect, the method further comprises: presenting a plurality of interface elements representing a plurality of event factors, respectively, each event factor belonging to at least one event of the first event or the second event, and the plurality of event factors comprising the first event factor.

In some embodiments of the first aspect, the method further comprises: receiving a selection of an interface element of the plurality of interface elements, and presenting the second event evolutionary graph in association with the first event evolutionary graph is in response to an interface element representing the first event factor being selected.

In some embodiments of the first aspect, the method further comprises: presenting a fourth node representing a fourth event having a second event relationship with the first event; and presenting, between the first node and the fourth node, a second directed edge representing the second event relationship.

In some embodiments of the first aspect, the method further comprises at least one of: presenting an indication of a correlation degree For the first event relationship, or presenting the first directed edge in a visual pattern corresponding to the correlation degree.

In some embodiments of the first aspect, the method further comprises: receiving a user input specifying the number of hierarchies to be extended for the first event factor, and the presented second event evolutionary graph has the specified number of hierarchies.

In some embodiments of the first aspect, the second event evolutionary graph is determined by: determining a subgraph with the number of hierarchies as the second event evolutionary graph by starting from a node representing the third event in a reference event evolutionary graph.

In some embodiments of the first aspect, the third node has a visual effect different with the first node and the second node.

In a second aspect, the present disclosure provides an electronic device. The electronic device includes at least one processing circuit. The at least one processing circuit is configured to present a first event evolutionary graph corresponding to a media content. The first event evolutionary graph includes at least a first node representing a first event, a second node representing a second event, and a first directed edge representing a first event relationship between the first event and the second event. The first event, the second event, and the first event relationship are determined from the media content. The at least one processing circuit is further configured to present a second event evolutionary graph in association with the first event evolutionary graph. The second event evolutionary graph comprises at least a third node representing a third event. A first event factor of at least one event of the first event or the second event matches a second event factor of the third event.

In some embodiments of the second aspect, the at least one processing circuit is further configured to associate the second event evolutionary graph with the first event evolutionary graph visually through an interface element representing the first event factor.

In some embodiments of the second aspect, the at least one processing circuit is further configured to: present a first directed element pointing from the interface element to a node in the first event evolutionary graph representing the at least one event; and present a second directed element pointing from the interface element to the third node.

In some embodiments of the second aspect, the at least one processing circuit is further configured to present a plurality of interface elements representing a plurality of event factors, respectively, each event factor belonging to at least one event of the first event or the second event, and the plurality of event factors comprising the first event factor.

In some embodiments of the second aspect, the at least one processing circuit is further configured to: receive a selection of an interface element of the plurality of interface elements, and present the second event evolutionary graph in association with the first event evolutionary graph is in response to an interface element representing the first event factor being selected.

In some embodiments of the second aspect, the at least one processing circuit is further configured to: present a fourth node representing a fourth event having a second event relationship with the first event; and present, between the first node and the fourth node, a second directed edge representing the second event relationship.

In some embodiments of the second aspect, the at least one processing circuit is further configured to: present an indication of a correlation degree For the first event relationship, or present the first directed edge in a visual pattern corresponding to the correlation degree.

In some embodiments of the second aspect, the at least one processing circuit is further configured to: receive a user input specifying the number of hierarchies to be extended for the first event factor, and the presented second event evolutionary graph has the specified number of hierarchies.

In some embodiments of the second aspect, the second event evolutionary graph is determined by: determine a subgraph with the number of hierarchies as the second event evolutionary graph by starting from a node representing the third event in a reference event evolutionary graph.

In some embodiments of the second aspect, the third node has a visual effect different with a first node and the second node.

In a third aspect, the present disclosure provides a computer readable storage medium. The computer readable storage medium stores a computer program that can be executed by a processor to implement the method of the first aspect.

In a fourth aspect, the present disclosure provides a method for information processing. The method includes generating a first event evolutionary graph corresponding to a media content. The first event evolutionary graph comprises at least a first node representing a first event, a second node representing a second event, and a first directed edge representing a first event relationship between the first event and the second event. The first event, the second event, and the first event relationship are determined from the media content. The method further includes determining, based on a first event factor of at least one event of the first event or the second event, a third event having a second event factor matching the first event factor from a reference event evolutionary graph. The method further includes combining the first event evolutionary graph with a second event evolutionary graph comprising at least a third node representing the third event.

In some embodiments of the fourth aspect, the method further comprises: determining, from the reference event evolutionary graph, a fourth event having a second event relationship with the first event; adding a fourth node representing the fourth event to the first event evolutionary graph; and adding, between the first node and the fourth node, a second directed edge representing the second event relationship.

In some embodiments of the fourth aspect, the method further comprises: storing a correlation degree For the first event relationship in association with the first directed edge.

In some embodiments of the fourth aspect, the second event evolutionary graph is determined by: determining the number of hierarchies to be extended for the first event factor; and determining a subgraph with the number of hierarchies as the second event evolutionary graphs by tarting from a node representing the third event in the reference event evolutionary graph.

In some embodiments of the fourth aspect, the number is specified by a user input.

In some embodiments of the fourth aspect, the method further comprises: determining a first similarity between the first event and a fifth event represented by a fifth node in the reference event evolutionary graph, and a second similarity between the second event and a sixth event represented by a sixth node in the reference event evolutionary graph; and updating the reference event evolutionary graph based on the first similarity, the second similarity, a first threshold, and a second threshold below the first threshold.

In some embodiments of the fourth aspect, updating the reference event evolutionary graph comprises: in response to the first similarity exceeding the first threshold and the second similarity exceeding the first threshold, adding, between the fifth node and the sixth node, a directed edge representing the first event relationship.

In some embodiments of the fourth aspect, updating the reference event evolutionary graph comprises: in response to the first similarity exceeding the first threshold and the second similarity being below the second threshold, adding a seventh node representing the second event to the reference event evolutionary graph; and adding, between the fifth node and the seventh node, a directed edge representing the first event relationship.

In some embodiments of the fourth aspect, updating the reference event evolutionary graph comprises: in response to both the first similarity and the second similarity being between the first threshold and the second threshold, adding the first event evolutionary graph to the reference event evolutionary graph; and adding, to the reference event evolutionary graph, an indication that the first event is similar to the fifth event and an indication that the second event is similar to the sixth event.

In some embodiments of the fourth aspect, the method further comprises: in response to the media content being presented or selected, presenting the combined first event evolutionary graph and second event evolutionary graph.

In a fifth aspect, the present disclosure provides an electronic device. The electronic device includes at least one processing circuit. The at least one processing circuit is configured to generate a first event evolutionary graph corresponding to a media content. The first event evolutionary graph comprises at least a first node representing a first event, a second node representing a second event, and a first directed edge representing a first event relationship between the first event and the second event. The first event, the second event, and the first event relationship are determined from the media content. The at least one processing circuit is further configured to determine, based on a first event factor of at least one event of the first event or the second event, a third event having a second event factor matching the first event factor from a reference event evolutionary graph. The at least one processing circuit is further configured to combine the first event evolutionary graph with a second event evolutionary graph comprising at least a third node representing the third event.

In some embodiments of the fifth aspect, the at least one processing circuit is configured to: determine, from the reference event evolutionary graph, a fourth event having a second event relationship with the first event; add a fourth node representing the fourth event to the first event evolutionary graph; and add, between the first node and the fourth node, a second directed edge representing the second event relationship.

In some embodiments of the fifth aspect, the at least one processing circuit is further configured to: store a correlation degree For the first event relationship in association with the first directed edge.

In some embodiments of the fifth aspect, the second event evolutionary graph is determined by: determining the number of hierarchies to be extended for the first event factor; and determining a subgraph with the number of hierarchies as the second event evolutionary graphs by tarting from a node representing the third event in the reference event evolutionary graph.

In some embodiments of the fifth aspect, the number is specified by a user input.

In some embodiments of the fifth aspect, the at least one processing circuit is further configured to: determine a first similarity between the first event and a fifth event represented by a fifth node in the reference event evolutionary graph, and a second similarity between the second event and a sixth event represented by a sixth node in the reference event evolutionary graph; and update the reference event evolutionary graph based on the first similarity, the second similarity, a first threshold, and a second threshold below the first threshold.

In some embodiments of the fifth aspect, the at least one processing circuit is further configured to: in response to the first similarity exceeding the first threshold and the second similarity exceeding the first threshold, add, between the fifth node and the sixth node, a directed edge representing the first event relationship.

In some embodiments of the fifth aspect, the at least one processing circuit is further configured to: in response to the first similarity exceeding the first threshold and the second similarity being below the second threshold, add a seventh node representing the second event to the reference event evolutionary graph; and add, between the fifth node and the seventh node, a directed edge representing the first event relationship.

In some embodiments of the fifth aspect, the at least one processing circuit is further configured to: in response to both the first similarity and the second similarity being between the first threshold and the second threshold, add the first event evolutionary graph to the reference event evolutionary graph; and add, to the reference event evolutionary graph, an indication that the first event is similar to the fifth event and an indication that the second event is similar to the sixth event.

In some embodiments of the fifth aspect, the at least one processing circuit is further configured to: in response to the media content being presented or selected, present the combined first event evolutionary graph and second event evolutionary graph.

In a sixth aspect, a computer-readable storage medium is provided. The computer readable storage medium stores a computer program that can be executed by a processor to implement the method of the fourth aspect.

Various aspects of the present disclosure are described herein with reference to the flow chart and/or the block diagram of the method, the apparatus, the device and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, specialized computers, or other programmable data processing devices to produce a machine that generates an apparatus to implement the functions/actions specified in one or more blocks in the flow chart and/or the block diagram when these instructions are executed through the computer or other programmable data processing apparatuses. These computer-readable program instructions may also be stored in a computer-readable storage medium. These instructions enable a computer, a programmable data processing apparatus and/or other devices to work in a specific way. Therefore, the computer-readable medium containing the instructions includes a product, which includes instructions to implement various aspects of the functions/actions specified in one or more blocks in the flowchart and/or the block diagram.

The computer-readable program instructions may be loaded onto a computer, other programmable data processing apparatus, or other devices, so that a series of operational steps may be performed on a computer, other programmable data processing apparatus, or other devices, to generate a computer-implemented process, such that the instructions which execute on a computer, other programmable data processing apparatuses, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a unit, a program segment, or instructions, which contains one or more executable instructions for implementing the specified logic function. In some alternative implementations, the functions labeled in the block may also occur in a different order from those labeled in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description is an example, not exhaustive, and is not limited to the disclosed implementations. Without departing from the scope and spirit of the described implementations, many modifications and changes are obvious to ordinary skill in the art. The selection of terms used in the present disclosure aims to best explain the principles, practical application or improvement of technology in the market of each implementation, or to enable other ordinary skill in the art to understand the various implementations disclosed herein.

What is claimed is:

1. A method of information presenting, comprising:
presenting a first event evolutionary graph corresponding to a media content, the first event evolutionary graph comprising at least a first node representing a first event, a second node representing a second event, and a first directed edge representing a first event relationship between the first event and the second event, the first event, the second event, and the first event relationship being determined from the media content;
determining a correlation degree for the first event relationship in association with the first directed edge;
determining, based on a first event factor of at least one event of the first event or the second event, a third event having a second event factor matching the first event factor from a reference event evolutionary graph;
combining the first event evolutionary graph with a second event evolutionary graph comprising at least a third node representing the third event;
determining, from the reference event evolutionary graph, a fourth event having a second event relationship with the first event;
adding a fourth node representing the fourth event to the first event evolutionary graph;

adding, between the first node and the fourth node, a second directed edge representing the second event relationship; and presenting a second event evolutionary graph in association with the first event evolutionary graph, the second event evolutionary graph comprising at least the third node representing the third event, a first event factor of at least one event of the first event or the second event matching a second event factor of the third event.

2. The method of claim 1, wherein presenting the second event evolutionary graph in association with the first event evolutionary graph comprises:

associating the second event evolutionary graph with the first event evolutionary graph visually through an interface element representing the first event factor.

3. The method of claim 2, wherein associating the second event evolutionary graph with the first event evolutionary graph visually comprises:

presenting a first directed element pointing from the interface element to a node in the first event evolutionary graph representing the at least one event; and presenting a second directed element pointing from the interface element to the third node.

4. The method of claim 1, further comprising:

presenting a plurality of interface elements representing a plurality of event factors, respectively, each event factor belonging to at least one event of the first event or the second event, and the plurality of event factors comprising the first event factor.

5. The method of claim 4, further comprising:

receiving a selection of an interface element of the plurality of interface elements, and wherein presenting the second event evolutionary graph in association with the first event evolutionary graph is in response to an interface element representing the first event factor being selected.

6. The method of claim 1, further comprising:

presenting a fourth node representing a fourth event having a second event relationship with the first event; and presenting, between the first node and the fourth node, a second directed edge representing the second event relationship.

7. The method of claim 1, further comprising at least one of:

presenting an indication of a correlation degree For the first event relationship, or presenting the first directed edge in a visual pattern corresponding to the correlation degree.

8. The method of claim 1, further comprising:

receiving a user input specifying the number of hierarchies to be extended for the first event factor, and wherein the presented second event evolutionary graph has the specified number of hierarchies.

9. The method of claim 8, wherein the second event evolutionary graph is determined by:

determining a subgraph with the number of hierarchies as the second event evolutionary graph by starting from a node representing the third event in a reference event evolutionary graph.

10. A method of information processing, comprising:

generating a first event evolutionary graph corresponding to a media content, the first event evolutionary graph comprising at least a first node representing a first event, a second node representing a second event, and a first directed edge representing a first event relationship between the first event and the second event, the first event, the second event, and the first event relationship being determined from the media content;

determining a correlation degree for the first event relationship in association with the first directed edge;

determining, based on a first event factor of at least one event of the first event or the second event, a third event having a second event factor matching the first event factor from a reference event evolutionary graph;

combining the first event evolutionary graph with a second event evolutionary graph comprising at least a third node representing the third event;

determining, from the reference event evolutionary graph, a fourth event having a second event relationship with the first event;

adding a fourth node representing the fourth event to the first event evolutionary graph; and adding, between the first node and the fourth node, a second directed edge representing the second event relationship.

11. The method of claim 10, wherein the second event evolutionary graph is determined by:

determining the number of hierarchies to be extended for the first event factor; and determining a subgraph with the number of hierarchies as the second event evolutionary graphs by tarting from a node representing the third event in the reference event evolutionary graph.

12. The method of claim 11, wherein the number is specified by a user input.

13. The method of claim 10, further comprising:

determining a first similarity between the first event and a fifth event represented by a fifth node in the reference event evolutionary graph, and a second similarity between the second event and a sixth event represented by a sixth node in the reference event evolutionary graph; and updating the reference event evolutionary graph based on the first similarity, the second similarity, a first threshold, and a second threshold below the first threshold.

14. The method of claim 13, wherein updating the reference event evolutionary graph comprises:

in response to the first similarity exceeding the first threshold and the second similarity exceeding the first threshold, adding, between the fifth node and the sixth node, a directed edge representing the first event relationship.

15. The method of claim 13, wherein updating the reference event evolutionary graph comprises:

in response to the first similarity exceeding the first threshold and the second similarity being below the second threshold, adding a seventh node representing the second event to the reference event evolutionary graph; and adding, between the fifth node and the seventh node, a directed edge representing the first event relationship.

16. The method of claim 13, wherein updating the reference event evolutionary graph comprises:

in response to both the first similarity and the second similarity being between the first threshold and the second threshold, adding the first event evolutionary graph to the reference event evolutionary graph; and adding, to the reference event evolutionary graph, an indication that the first event is similar to the fifth event and an indication that the second event is similar to the sixth event.

17. The method of claim 10, further comprising:
in response to the media content being presented or selected, presenting the combined first event evolutionary graph and second event evolutionary graph.

18. An electronic device, comprising:
at least one processing circuit configured to:
present a first event evolutionary graph corresponding to a media content, the first event evolutionary graph comprising at least a first node representing a first event, a second node representing a second event, and a first directed edge representing a first event relationship between the first event and the second event, the first event, the second event, and the first event relationship being determined from the media content;
determine a correlation degree for the first event relationship in association with the first directed edge;
determine, based on a first event factor of at least one event of the first event or the second event, a third event having a second event factor matching the first event factor from a reference event evolutionary graph;
combine the first event evolutionary graph with a second event evolutionary graph comprising at least a third node representing the third event;
determine, from the reference event evolutionary graph, a fourth event having a second event relationship with the first event;
add a fourth node representing the fourth event to the first event evolutionary graph;
add, between the first node and the fourth node, a second directed edge representing the second event relationship; and
present a second event evolutionary graph in association with the first event evolutionary graph, the second event evolutionary graph comprising at least the third node representing the third event, a first event factor of at least one event of the first event or the second event matching a second event factor of the third event.

* * * * *